US005600435A

United States Patent [19]
Bartko et al.

[11] Patent Number: 5,600,435
[45] Date of Patent: Feb. 4, 1997

[54] INTELLIGENT SENSOR METHOD AND APPARATUS FOR AN OPTICAL WHEEL ALIGNMENT MACHINE

[75] Inventors: Robert J. Bartko, Shelby Township; Jack H. Rosen, Farmington Hills, both of Mich.

[73] Assignee: Fori Automation, Inc., Shelby Township, Macomb County, Mich.

[21] Appl. No.: 449,520

[22] Filed: May 24, 1995

[51] Int. Cl.⁶ .............................. H04N 7/18; G01B 5/24; G01B 11/26
[52] U.S. Cl. ................................ 356/139.09; 33/203.16; 33/288
[58] Field of Search ....................... 348/136, 141; 356/139.09, 152.1, 152.2, 375; 33/203.16, 288

[56] References Cited

U.S. PATENT DOCUMENTS

| | | | |
|---|---|---|---|
| 3,187,185 | 6/1965 | Milnes . | |
| 3,590,258 | 6/1971 | Shibata et al. | 250/219 |
| 3,625,618 | 12/1971 | Bickel | 356/120 |
| 3,685,161 | 8/1972 | MacPherson | 33/288 |
| 3,709,609 | 1/1973 | Spengler et al. | 356/152 |
| 3,773,422 | 11/1973 | Stavis et al. | 356/156 |
| 3,895,870 | 7/1975 | Cullen et al. | 356/1 |
| 3,918,816 | 11/1975 | Foster et al. | 356/167 |
| 4,105,925 | 8/1978 | Rossol et al. | 250/561 |
| 4,111,557 | 9/1978 | Rottenkolber et al. | 356/168 |
| 4,188,544 | 2/1980 | Chasson | 250/560 |
| 4,225,238 | 9/1980 | Rottenkolber | 356/348 |
| 4,249,824 | 2/1981 | Wiederrich et al. | 356/155 |
| 4,302,104 | 11/1981 | Hunter | 356/152 |
| 4,335,962 | 6/1982 | De Matteo et al. | 356/376 |
| 4,373,804 | 2/1983 | Pryor et al. | 356/1 |
| 4,498,778 | 2/1985 | White | 356/376 |
| 4,523,844 | 6/1985 | Titsworth et al. | 356/152 |
| 4,541,721 | 9/1985 | Dewar | 356/375 |
| 4,598,481 | 7/1986 | Donahue | 33/288 |
| 4,645,348 | 2/1987 | Dewar et al. | 356/376 |
| 4,666,303 | 5/1987 | Prior | 356/375 |
| 4,690,557 | 9/1987 | Wiklund | 356/155 |
| 4,724,480 | 2/1988 | Hecker et al. | 356/375 |
| 4,745,469 | 5/1988 | Waldecker et al. . | |

(List continued on next page.)

FOREIGN PATENT DOCUMENTS

| | | |
|---|---|---|
| 2948573 | 11/1979 | Germany . |
| 3216098 | 4/1982 | Germany . |
| 55-107907 | 8/1980 | Japan . |
| 264204 | 5/1985 | Japan . |

*Primary Examiner*—Stephen C. Buczinski
*Attorney, Agent, or Firm*—Reising, Ethington, Barnard & Perry

[57] ABSTRACT

A sensor method and apparatus for an optical wheel alignment machine utilizes one or more light sources, such as lasers, to project a laser line or other shaped light onto various locations about the sidewall of a tire undergoing measurement. The sensor includes a video camera or other light responsive receiver and a optical system that combines the reflected laser lines into a single image that is received by the camera. The optical system also rotates one or more of the reflected laser lines so that all of the reflected portions have the same general orientation upon entering the camera. The camera outputs a video data stream that is indicative of the image. The sensor has an electronic circuit that analyzes this video data stream in real time to determine the location in the image of a preselected feature of each of the laser lines. The circuit then outputs coordinate data indicative of the location of this feature.

The circuit is microprocessor-based and uses a comparator that compares the incoming video data stream with a threshold to determine, on a pixel-by-pixel basis, whether any particular pixel lies on or outside one of the laser lines received by the camera. For a pixel lying on a laser line, the comparator interrupts operation of the microprocessor which then determines the position within the image of that pixel. Once the pixel representing the preselected feature is found, the microprocessor uses that information to generate the coordinate output data.

16 Claims, 7 Drawing Sheets

U.S. PATENT DOCUMENTS

| | | | |
|---|---|---|---|
| 4,761,749 | 8/1988 | Titsworth et al. | 364/559 |
| 4,863,266 | 9/1989 | Masuko et al. | |
| 4,889,425 | 12/1989 | Edwards et al. | 356/152 |
| 4,898,464 | 2/1990 | Thorne et al. | 356/152 |
| 5,054,918 | 10/1991 | Downing et al. | 356/152 |
| 5,085,510 | 2/1992 | Mitchell | 356/237 |
| 5,148,209 | 9/1992 | Subbarao | 354/400 |
| 5,163,002 | 11/1992 | Kurami | 364/424.02 |
| 5,164,823 | 11/1992 | Keeler | 358/95 |
| 5,172,005 | 12/1992 | Cochran et al. | 250/57 |
| 5,177,558 | 1/1993 | Hill | 356/152 |
| 5,208,646 | 5/1993 | Rogers et al. | 356/152 |
| 5,220,399 | 6/1993 | Christian et al. | 356/152 |
| 5,231,443 | 7/1993 | Subbarao | 354/400 |
| 5,243,766 | 9/1993 | Marley et al. | 33/288 |
| 5,268,731 | 12/1993 | Fuchiwaki et al. | |
| 5,274,433 | 12/1993 | Madey et al. | 356/155 |
| 5,280,542 | 1/1994 | Ozeki et al. | 382/8 |
| 5,291,660 | 3/1994 | Koerner | |
| 5,463,463 | 10/1995 | Harvey et al. | 356/375 |
| 5,532,816 | 7/1996 | Spann et al. | 356/139.09 |

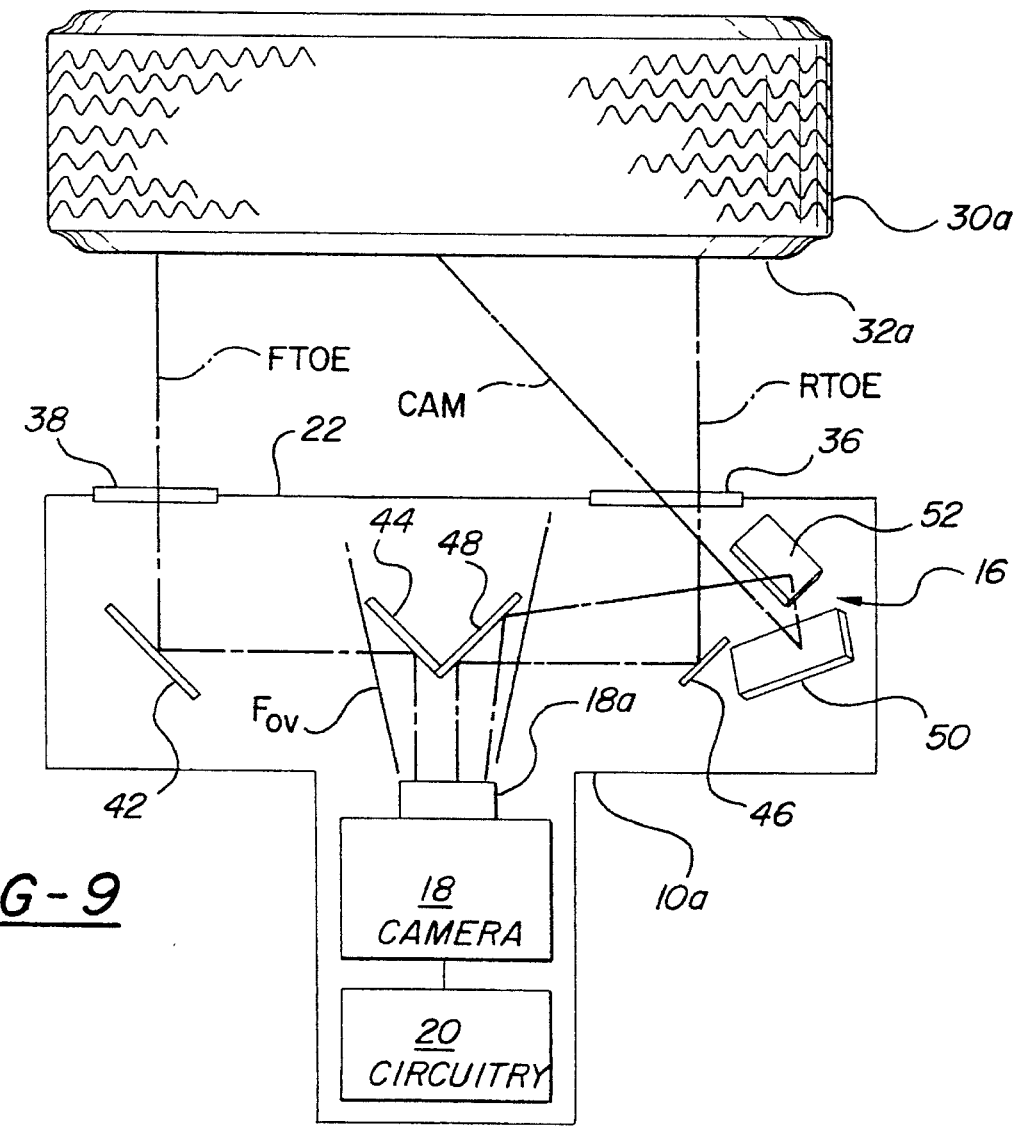
FIG-9
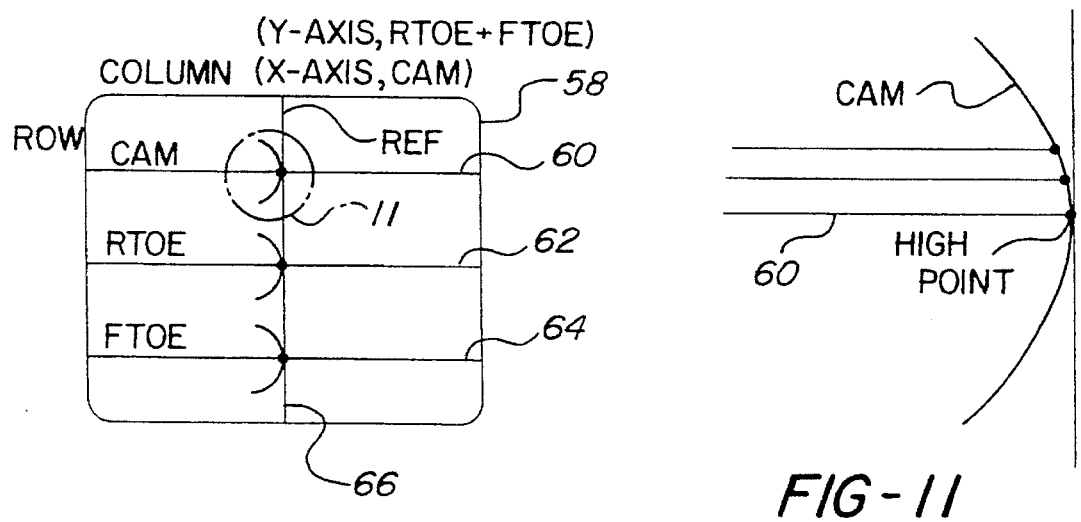
FIG-10
FIG-11

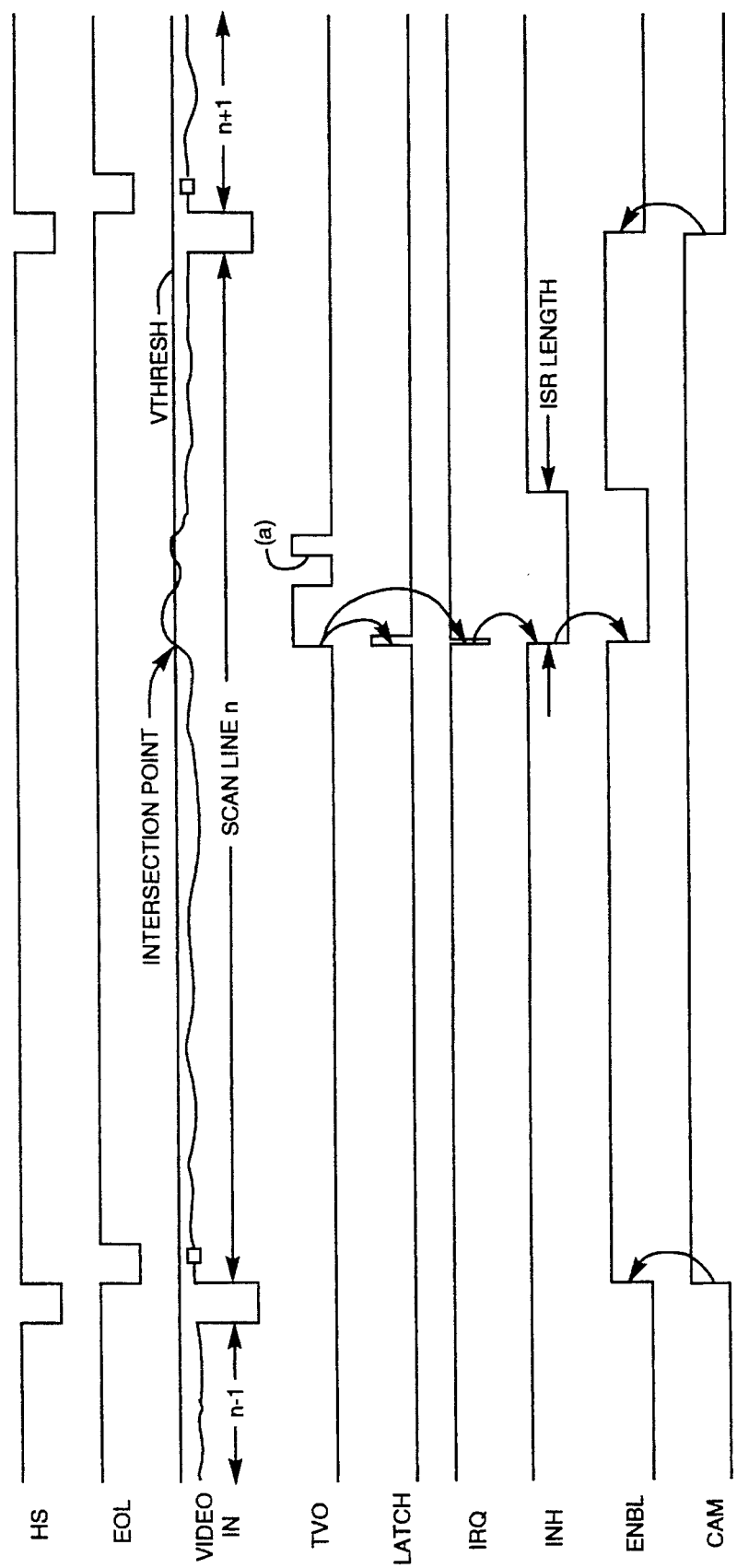

INTELLIGENT SENSOR METHOD AND APPARATUS FOR AN OPTICAL WHEEL ALIGNMENT MACHINE

TECHNICAL FIELD

This invention relates generally to automobile wheel alignment machines and, more particularly, to optical sensors used in non-contact wheel alignment machines to determine the alignment characteristics of one or more of the automobile's wheels.

BACKGROUND OF THE INVENTION

Wheel alignment machines are used by automobile manufacturers and service centers to determine and set various alignment characteristics of the vehicle wheels in accordance with the manufacturer's recommended specifications. These specifications are selected to meet the requirements of a given vehicle model and may therefore vary from one model to the next. Initially, the vehicle wheels are aligned by the manufacturer in accordance with the design specifications. Thereafter, the vehicle wheels should be periodically checked and realigned over the useful life of the vehicle. Such continued compliance with the manufacturer's recommended specifications is important in insuring proper road handling and minimizing tire wear.

For steerable wheels (e.g., the front two vehicle wheels), there are several wheel alignment characteristics that affect steering performance and tire wear. These characteristics include camber, caster, toe, and steering axis inclination (SAI). Two of these, caster and SAI angle, relate to the inclination of the steering axis from a purely vertical line and may be determined in various ways known to those skilled in the art. See, for example, U.S. Pat. No. 5,291,660, issued Mar. 8, 1994 to A. Koerner. The other two of these, camber and toe, relate to the orientation of the rotational plane of the vehicle wheel and are important to both steerable and unsteerable wheels. In particular, the camber of a vehicle wheel is a measurement of the inward or outward tilt of the wheel relative to a vertical plane extending in the vehicle's longitudinal direction. The toe of a vehicle wheel is a measurement of the inward or outward tilt of the wheel relative to a horizontal plane extending through the wheel's center.

Many techniques have been developed to determine the rotational plane and, hence, the camber and toe of a vehicle wheel. The vast majority of these techniques have required some type of physical contact with the vehicle wheel. For example, in some wheel alignment machines, position encoders are used to generate signals indicative of the positions of rollers that contact the tire's sidewall. Generally, three such rollers and associated encoders are used for each wheel, with the rollers being spaced ninety degrees apart. The encoders provide a data stream indicating the distances of the rollers from a vertically disposed plane that extends in the vehicle's longitudinal direction. This data is used by a central computer to calculate the camber and toe angles.

More recently, optical techniques have been developed that permit determination of these alignment characteristics without any targets or other parts of the measurement apparatus having to come into physical contact with the vehicle wheel. See, for example, U.S. Pat. No. 4,745,469, issued May 17, 1988 to T. J. Waldecker et al.; U.S. Pat. No. 4,863,266, issued Sep. 5, 1989 to S. Masuko et al.; and U.S. Pat. No. 5,268,731, issued Dec. 7, 1993 to M. Fuchiwaki et al. Non-contact optical measurement of wheel alignment characteristics is advantageous because it provides good resolution and the ability to determine alignment characteristics without moving parts and without requiring contact between the measurement equipment and the vehicle. For each wheel, actual measurement of the wheel position is accomplished using an optical sensor that includes a light source for projecting light onto the wheel and a light responsive receiver for sensing a portion of the projected light reflected off the wheel.

In the patent to Waldecker et al., wheel alignment measurement is accomplished using a non-contact sensor station located adjacent each of the vehicle wheels. The sensor station for each wheel utilizes a plurality of sensor modules, each of which includes a laser light source and an associated video camera. The laser light sources at each wheel are used to project stripes of laser light that extend radially across the sidewall at two or more spaced locations. The video cameras at each sensor station are used to sense reflections of their associated laser's light off the tire's sidewall. Each camera is offset from the optical plane of its associated laser to give it a perspective view that permits the determination of distance between the sensor and tire sidewall. Because of the curved contour of the tire's sidewall, the reflected line of laser light, as seen from the perspective of the associated video camera, will have a generally parabolic shape. The images sensed by the video cameras are provided to a computer system that includes an alignment processor engine and an integrated host/alignment processor engine, both of which employ separate VME buses for communication. These processor engines are used to analyze the images to determine the locations within the images of the reflected laser lines. This information is then used to derive the camber, toe, or both. The system can include a transition detection circuit that monitors the digital video stream as it is being written into memory to determine the crown of the reflected parabolic laser line, which represents the point on the tire sidewall that is closest to the sensor module. This is accomplished by turning each camera on its side such that the reflected laser line, as seen by the camera, has a generally vertical orientation. Each scan line of the camera will then intersect the reflected laser line and the closest point of the tire sidewall can then be found by determining the row (scan line) number and column number of the crown of the reflected parabolic laser line. This information can then be used by the processors to quickly determine the probable location of the closest point to the sensor module.

This prior art system suffers primarily from its complexity and the resulting cost to implement. More specifically, in the preferred embodiment, the system utilizes three lasers and three video cameras for each wheel to determine the camber and toe angles. For a vehicle having four wheels, this means twelve lasers and twelve video cameras are required. Additionally, the computer system acquires complete frames of data from each of these cameras and must then utilize the two VME based processors operating in parallel to perform image processing to determine the location within each frame of the reflected laser light. Furthermore, the sensor stations do not themselves provide data indicative of the distance between the tire and sensor; rather, they only provide video frames and, therefore, their output data cannot be used with existing wheel alignment computers or in a conventional manner to determine the wheel alignment characteristics.

SUMMARY OF THE INVENTION

In accordance with the present invention there is provided an intelligent sensor for use in a wheel alignment machine to measure the orientation of a tire on a vehicle to thereby determine one or more alignment characteristics of the vehicle. The sensor includes one or more light sources oriented to project shaped light onto a sidewall of the tire at a plurality of spaced locations and a video camera or other light responsive receiver oriented at a perspective angle with respect to the light source(s) to receive an image that includes a portion of the shaped light that is reflected off the tire. The sensor further includes a system of optical elements and an electronic circuit. The optical elements are oriented relative to the light responsive receiver to provide the light responsive receiver with an optical view that includes the plurality of spaced locations of the tire. Thus, portions of the shaped light that are reflected off the tire at each of the plurality of spaced locations are received by the light responsive receiver as a single image. The light responsive receiver generates electrical signals indicative of this image. The electronic circuit utilizes the electrical signals to determine the location within the image of a predetermined feature of each of the reflected portions of shaped light, and the circuit generates output data representative of the locations of the predetermined features.

Preferably, the light source(s) are three visible lasers, each of which is oriented to project a stripe of laser light onto the sidewall at a different one three spaced locations, whereby the shaped light at each of the plurality of spaced locations comprises a stripe of laser light. Also, the light responsive receiver preferably comprises a video camera having an image receiving element that includes successive scan lines, each of which comprises a number of pixels.

In accordance with another aspect of the invention, the sensor operates to determine a preselected feature of each of the reflected portions of laser lines or other shaped light in real time and to generate conventional output coordinate data for use by a computer to determine one or more alignment characteristics. For this purpose, the optical elements are preferably oriented to rotate at least one of the reflected laser lines with respect to at least one other of the reflected laser lines so that all three reflected laser lines have the same orientation when they enter the light responsive receiver. The video camera generates the electrical signals as a stream of pixel data points arranged into successive lines of the pixel data points, with each of the lines of pixel data points representing one of the scan lines. It is oriented to receive the reflected portions of the stripes of laser light as lines of laser light that intersect at least some of the camera's scan lines. The circuit includes a microprocessor and operates to monitor the stream of pixel data points as it is received from the video camera. The electronic circuit interrupts operation of the microprocessor when the circuit receives a particular pixel data point representative of any of the reflected portions of the stripes of laser light. The microprocessor responds by acquiring a pixel count representing the position of the particular pixel data point within its associated line of pixel data points. Using this pixel count and the known position of the scan line in the video frame, the circuit generates output data representative of the coordinates of a preselected feature of the reflected laser lines.

By combining the reflected laser lines or other portions of shaped light into a single image, only one video camera or other light responsive receiver is needed. Also, by rotating one or more of the reflected portions of shaped light so that they all have the same orientation, and by providing them to the camera such that they intersect the camera's scan lines, real-time analysis of the video data to determine conventional coordinate data indicative of the wheel's rotational plane is made possible.

In accordance with yet another aspect of the invention, a method is provided for generating data indicative of the orientation of a tire on a vehicle, comprising the steps of:
(a) projecting shaped light onto a sidewall of a tire at a plurality of spaced locations,
(b) receiving an image that includes portions of the shaped light reflected at an angle off the sidewall from each of the plurality of spaced locations,
(c) generating a video signal that comprises a stream of pixel intensity levels arranged into successive groups of the pixel intensity levels, each of the groups representing a row of an array of pixels intensity levels that together represent the image,
(d) providing a threshold intensity level that is less than those of the pixel intensity levels that represent the reflected portions of the shaped light,
(e) determining a plurality of pixel counts by repeating the following steps (e1) through (e3) for each of a plurality of the groups of pixel intensity levels:
   (e1) comparing, in real time, the threshold intensity level with at least some of the pixel intensity levels of one of the groups,
   (e2) generating a logic signal when one of the pixel intensity levels exceeds the threshold intensity level, and
   (e3) determining, in response to an occurrence of the logic signal, one of the pixel counts in accordance with the position of the one of the pixel intensity levels within the one of the groups, and
(f) using the pixel counts to generate output data representative of the spatial position of the plurality of spaced locations.

In accordance with a broader aspect of the invention, the above-summarized method and apparatus of the invention could be utilized to determine one or more spatial attributes of an object other than a vehicle wheel. Rather than projecting shaped light onto a tire to determine alignment characteristics, the shaped light can be projected on any of a number of different types of objects to determine the position, orientation, or other spatial attribute of the object.

BRIEF DESCRIPTION OF THE DRAWINGS

A preferred exemplary embodiment of the present invention will hereinafter be described in conjunction with the appended drawings, wherein like designations denote like elements, and:

FIG. 9 is a plan view of the wheel and sensor of FIG. 4 showing the sensor optical system;

FIG. 10 shows an image output by the camera used by the sensor of FIG. 4, with the image representing the reflected shaped light from three circumferentially spaced locations on a master gauge used to calibrate the sensor;

FIG. 11 is an enlarged view of one of the reflected portions of shaped light from FIG. 10 and is included as part of a general description of a preferred procedure for determining the high point of the reflected portion of shaped light;

FIG. 15 is a timing diagram showing various signals used and generated by the sensor electronics.

DESCRIPTION OF THE PREFERRED EMBODIMENT

Sensor/Wheel Alignment Machine Overview

Figure 1:
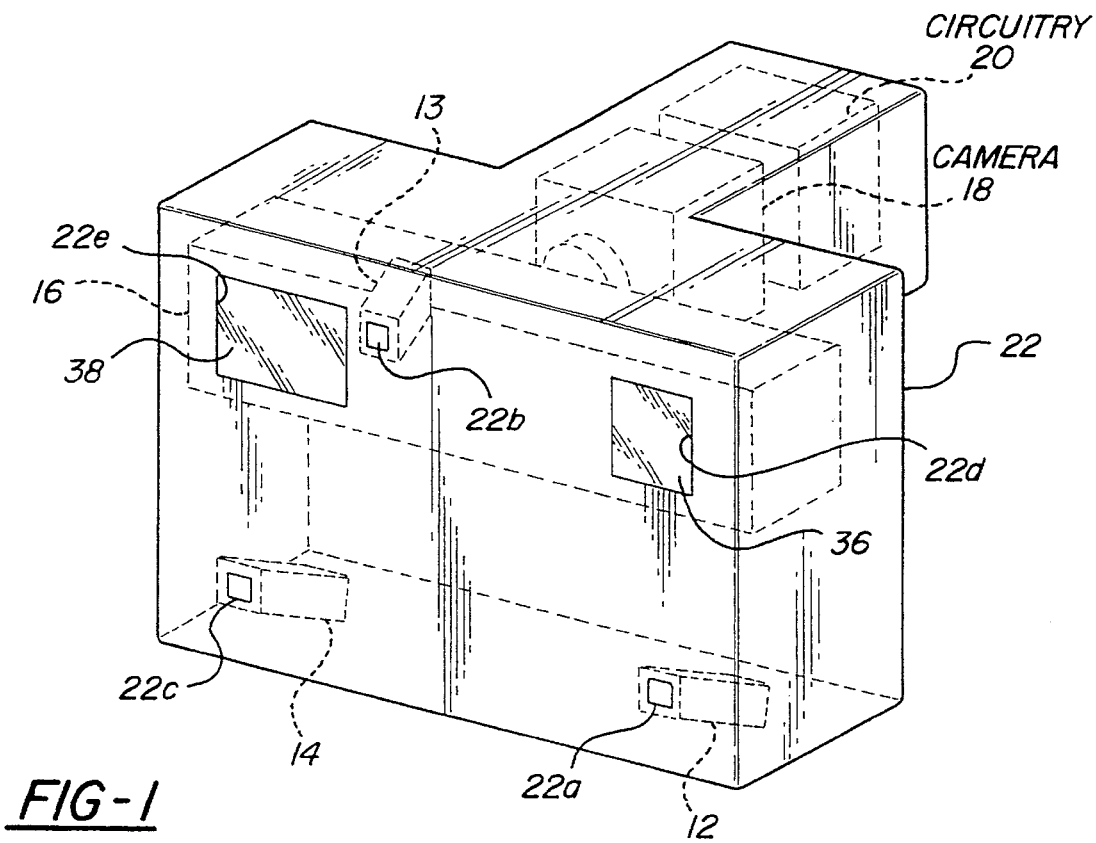
FIG. 1 is a diagrammatic overview of a preferred embodiment of an optical wheel alignment sensor of the present invention.

As shown in FIG. 1, a preferred embodiment of an optical wheel alignment sensor of the invention, designated generally at 10, utilizes three lasers 12, 13, and 14, an optical system 16, a video camera 18, and an electronic circuit 20, all of which are contained in a housing 22. In general, lasers 12–14 are used to project shaped laser light onto three, spaced locations on the sidewall of a tire that is mounted on a wheel undergoing measurement. Diffusely reflected laser light from each of the three locations re-enters housing 22 and optical system 16 where it is reflected and, in some cases, rotated to combine the three reflected portions of laser light into a single image that is then directed into camera 18. Camera 18 outputs a video stream representing successive frames of images and this output is provided to electronic circuit 20. The video data is analyzed in real time by circuit 20 to generate output data representative of the positions within each image of the three reflected portions of laser light.

Figure 2:
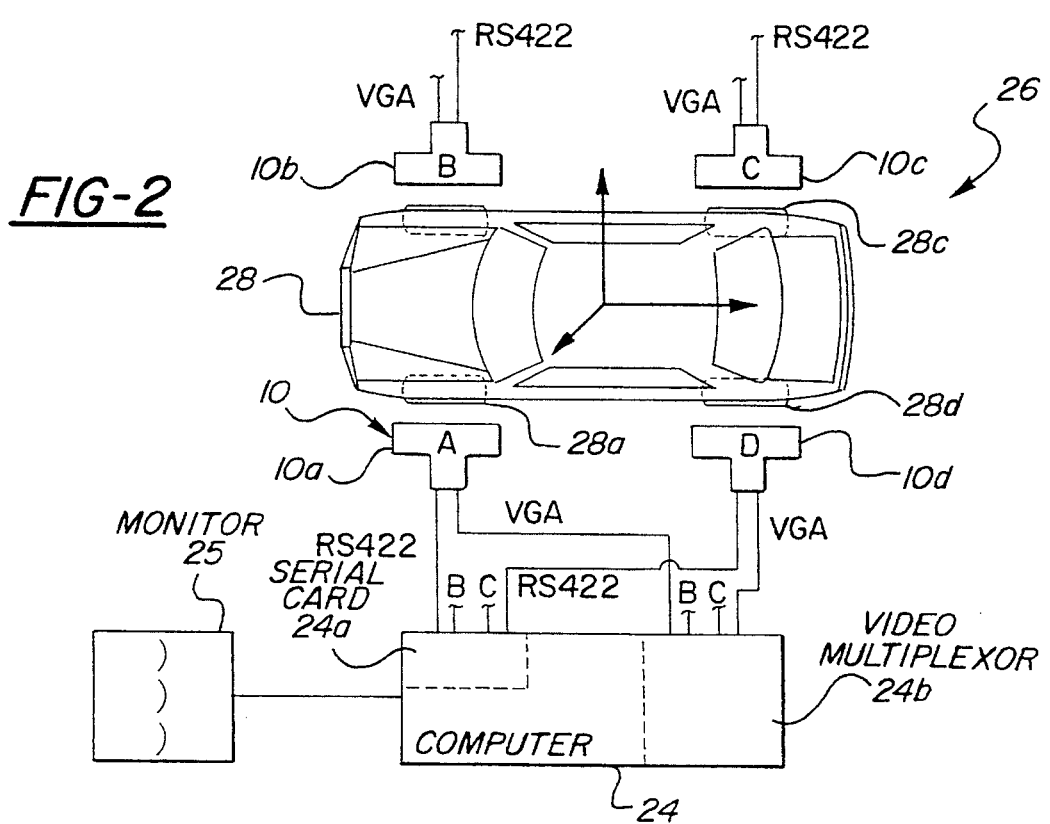
FIG. 2 is a diagrammatic plan view of a wheel alignment machine that includes four of the optical wheel alignment sensors of FIG. 1.

Referring now also to FIG. 2, this output data is sent from circuit 20 to a central computer 24 that forms a part of a wheel alignment machine 26 with which sensor 10 is used. Sensor 10 is one of four identical sensors 10a–10d used as a part of wheel alignment machine 26 to determine certain alignment characteristics of each of the four wheels 28a–28d of a typical automobile 28. Each of the sensors 10a–10d are mounted on a vehicle test rig (not shown) that supports automobile 28 in a conventional manner. The positions of each of the sensors 10a–10d is selected so that each sensor will be adjacent one of the four wheels 28a–28d. If desired, sensors 10a–10d can be adjustable in one or more directions to account for different vehicle wheel bases, vehicle widths, and wheel widths and diameters.

The output data from each of the sensors 10a–10d is sent over a different one of four RS-422 serial lines that are connected to a four channel serial card 24a within computer 24. These serial lines are also used to send commands from computer 24 to one or more of the sensors 10a–10d, as will be described. Preferably, each of the sensors also provides a video signal to a four channel video multiplexor 24b within computer 24 for display on a monitor 25. For each sensor, this video signal is generated by circuit 20, which conditions the video signal output by its associated camera 18 and superimposes on the image one or more cursors that are used to highlight a particular feature of each of the three reflected portions of laser light.

Spatial Conventions

Figure 3:
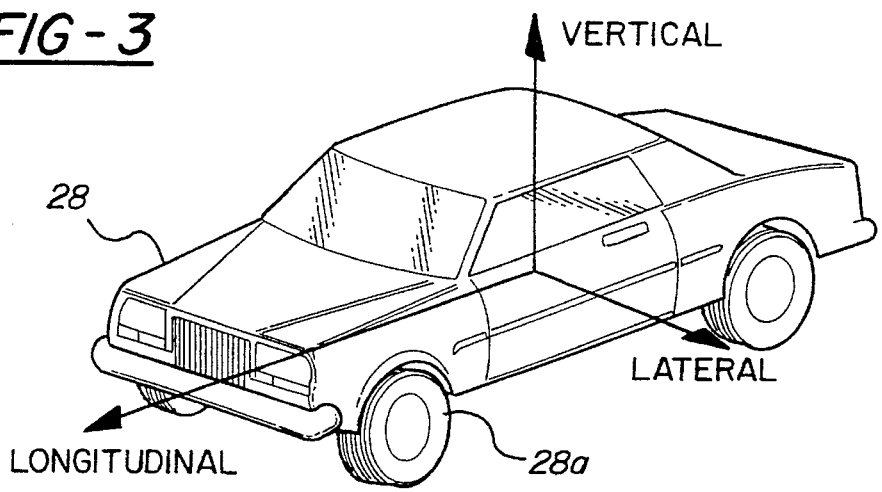
FIG. 3 depicts the convention used to define the orientation of a vehicle undergoing measurement in the wheel alignment machine of FIG. 2.

Before describing the construction and operation of sensor 10 in detail, reference is made to FIGS. 3 and 4 which show certain of the conventions that will be used below. As shown in FIG. 3, the orientation of vehicle 28 can be depicted by three orthogonally related axes: a longitudinal axis extending along the length of the vehicle, a lateral axis extending along the width of the vehicle, and a vertical axis extending in the third dimension, with the three axes intersecting at a point arbitrarily selected to be the center of vehicle 28. As will be discussed further below, vehicle 28 is preferably oriented on the test rig with its longitudinal axis aligned with the test rig's longitudinal axis and any deviations between the two are accounted for by computer 24 using a symmetry correction.

Figure 4:
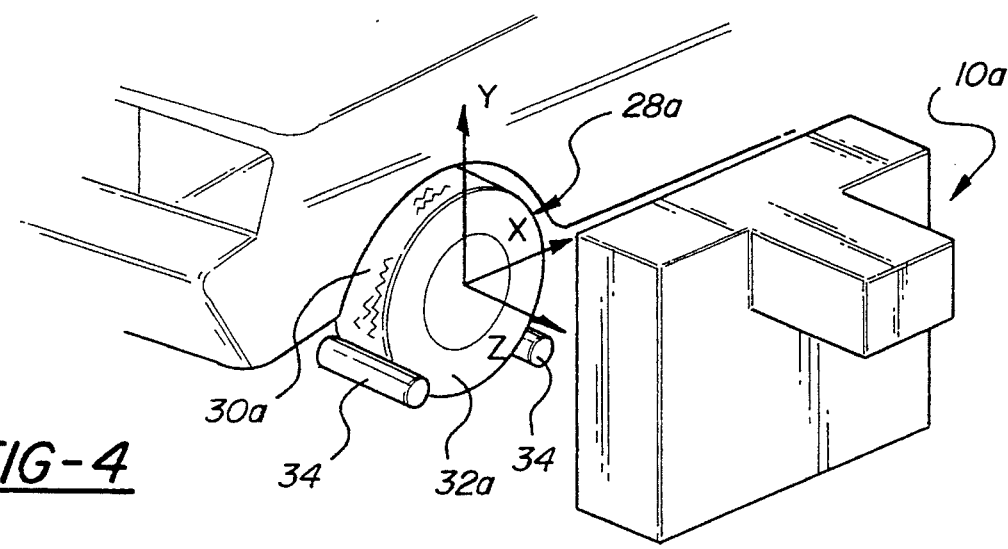
FIG. 4 is a perspective view showing the positioning of one of the sensors in FIG. 2 relative to the left front wheel of the vehicle and showing the convention used to define the spatial positions of the sensor and wheel for the purposes of measurement of the wheel's alignment characteristics.

FIG. 4 depicts the relative positioning of sensor 10a relative to the left, front wheel 28a. In the description that follows, only sensor 10a and its use with wheel 28a will be discussed and it will be understood that the discussion will apply equally to the other sensors 10b–10d and their use with wheels 28b–28d, respectively. Wheel 28a includes a tire 30a having a sidewall 32a upon which the laser light is directed for the purposes of measurement. Wheel 28a is supported by tire 30a on a pair of rollers 34, one or both of which can be a driven roller to permit dynamic measurement of the various wheel alignment characteristics.

For the purpose of wheel alignment measurement, sensor 10a and wheel 28a are both spatially referenced to three orthogonally related X, Y, and Z axes. These axes are parallel to the longitudinal, vertical, and lateral axes, respectively, of the test rig. The optical path of sensor 10a, as determined specifically by optical system 16 and camera 18, is generally along the Z-axis and camera 18 therefore receives an image that lies generally within the plane defined by the X and Y axes.

Sensor Construction and Operation Overview

Referring back to FIG. 1, lasers 12 and 14 are located near the bottom of housing 22 and laser 13 is located at the top of housing 22. Optical system 16 is located at the top, front portion of housing 22 above lasers 12 and 14 and just below laser 13. Behind optical system 16 is camera 18 and at the very rear of housing 22 is electronic circuit 20. Lasers 12–14 each project shaped laser light out of housing 22 and onto sidewall 32a of tire 30a through a respective aperture 22a–22c. Portions of the laser light reflected off sidewall 32a re-enters housing 22 through one of two apertures 22d and 22e. These two apertures are covered by filters 36 and 38, respectively, to keep out light at wavelengths other than that of the reflected laser light. These filters provide camera 18 with a dark background to help maximize the contrast between the reflected laser light and its background. Reflected light originating from laser 12 enters through aperture 22d and is redirected by optical system 16 along an optical path and into camera 18's field of view. Reflected light from lasers 13 and 14 enters through aperture 22e and is directed into camera 18 along one of two other optical paths, depending upon where on sidewall 32a the light was reflected from. The construction of optical system 16 that provides these three optical paths to camera 18 will be described below.

Figure 5:
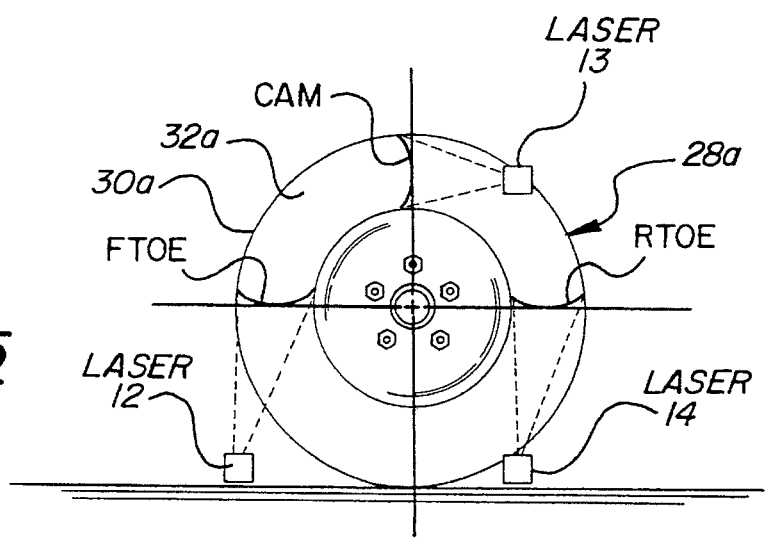
FIG. 5 is a side view of the vehicle's left front wheel showing diagrammatically how lasers within the sensor of FIG. 4 are used to project shaped laser light onto the sidewall of a tire mounted on the wheel.

Turning now to FIG. 5, the projection of shaped light by lasers 12–14 onto sidewall 32a of tire 30a will be described. As used herein, shaped light should be understood to mean light, whether coherent or not and whether focussed, collimated, scanned, diffracted or otherwise, that is projected onto sidewall 32a in a predetermined conformation. Preferably, lasers 12–14 each emit a plane of visible light that appears on sidewall 32a as a radially oriented stripe of laser light. Suitable lasers for providing a stripe of laser light are commercially available, such as an LG23, available from Applied Laser Systems. As shown, lasers 12 and 14 are used to project their laser line onto sidewall 32a at forward and rear locations, respectively, midway up the tire. These two laser lines are used to determine the toe angle for wheel 28a. Laser 13 is used to project its laser line onto sidewall 32a at the uppermost part of tire 30a. The laser line emitted by laser 13 is used in connection with the other two laser lines to determine the camber angle for wheel 28a. Thus, lasers 12 and 14 project in a plane that is parallel to the longitudinal axis of the test rig (i.e., parallel to the sensor's X-axis) and laser 13 projects in a plane that is parallel to the vertical axis (i.e., parallel to the sensor's Y-axis). The laser line emitted by laser 12 is referred to as FTOE (front toe) and the laser line emitted by laser 14 is referred to as RTOE (rear toe), with these labels indicating their relative positions on sidewall 32a. Thus, the FTOE laser line is so labelled because it is located closer to the front end of vehicle 28 than RTOE and, similarly, RTOE is so labelled because it is more towards the rear end of vehicle 28. The laser line emitted by laser 13 is referred to as CAM, since it is used in to determine the camber angle for wheel 28a.

Lasers 12 and 14 are located at the bottom of housing 22 and they are therefore directed upwards at an angle. Also, since apertures 22d and 22e are located near the top of housing 22 and are therefore offset from lasers 12 and 14, reflected laser light enters through these apertures at an upwards angle. Preferably, the total angle between the direction of laser light emitted from lasers 12 and 14 and the direction of reflected laser light received within apertures 22d and 22e is fifty-five degrees. Laser 13 is directed towards the front of vehicle 28 at a relatively small angle with respect to the Z-axis shown in FIG. 4 and the reflected CAM laser line enters through aperture 22e at a larger angle with respect to this same axis. It will be appreciated that, although the CAM laser line appears from the perspective of the Z-axis as having its concave side facing toward the front of vehicle 28, the CAM laser line enters through aperture 22e with its concave side facing rearwardly. This occurs because aperture 22e sees the reflected CAM laser line from the right or rearward side of laser 13, whereas the Z-axis perspective shown in FIG. 5 is from the left or forward side of laser 13. In the illustrated embodiment, laser 13 is at a fifteen degree angle from the Z-axis, as measured in the X-direction, and the CAM laser light enters aperture 22e at a thirty degree angle from the Z-axis, giving fifteen degrees of relative angle between the emitted and reflected CAM laser line. Alternatively, laser 13 can be directed straight along the Z-axis shown in FIG. 4 with the reflected CAM laser light entering aperture 22e at a forty-five degree angle to the Z-axis to give a greater degree of perspective angle.

In accordance with the normal shape of vehicle tires, sidewall 32a has a curved surface and the reflected FTOE, RTOE, and CAM laser lines have a generally parabolic shape when viewed from the perspective angles of optical system 16. As will be appreciated, the crown, or high-point, of each of the curved laser lines represents the point along the laser line that is closest to sensor 10a. Preferably, lasers 12 and 14 are aimed so that, for a vehicle properly centered in the test rig and having zero camber and toe, the high point of the FTOE and RTOE laser lines on the tire sidewall is within the horizontal plane defined by the X and Z axes. Also, laser 13 is preferably aimed so that, for that same vehicle, the high point of the CAM laser line on the tire sidewall is within the vertical plane defined by the Y and Z axes.

Figure 6:
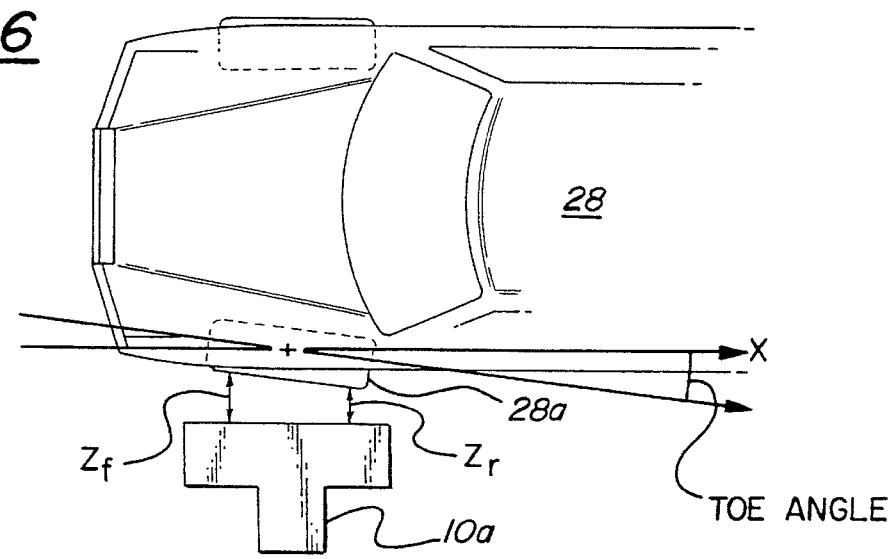
FIG. 6 is a top view of the vehicle showing the relative positioning of the wheel and sensor of FIG. 4, with the wheel exhibiting positive toe.
Figure 7:
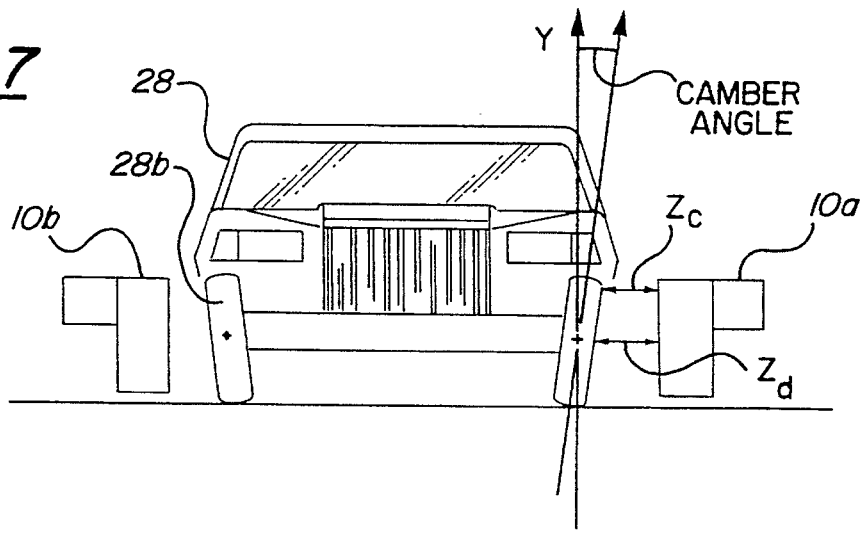
FIG. 7 is a front view of the vehicle showing the relative positioning of the wheel and sensor of FIG. 4, with the wheel exhibiting positive camber.

As is known by those skilled in the art, the high point of each of the three laser lines defines the rotational plane of tire 30a. Since the toe of wheel 28a is the angle between this rotational plane and the vehicle's longitudinal axis, the difference between the distance $z_f$ from FTOE to sensor 10a and the distance $z_r$ from RTOE to sensor 10a can be used to determine this toe angle. This is shown in FIG. 6. Similarly, and as shown in FIG. 7, since the camber of wheel 28a is the angle between the wheel's rotational plane and the vehicle's vertical axis, the difference between a distance $z_d$ and the distance $z_c$ from CAM to sensor 10a can be used to determine this camber angle. Distance $z_d$ is the distance along the Z-axis between sensor 10a and the center of wheel 28a and is determined in a manner that will be described in greater detail below.

The distances between sensor 10a and the high points of FTOE, RTOE, and CAM (i.e., $z_f$, $z_r$, and $z_c$) are not measured directly by sensor 10a. Rather, sensor 10a determines the X and Y coordinates of these high points and sends them to computer 24, which determines the $z_f$, $z_r$, and $z_c$ distances by comparing the coordinates for each high point to known reference points. As is known, use of these coordinates to derive the Z-axis distances is possible because changes in the distance between sensor 10a and sidewall 32a cause changes in the locations on sidewall 32a where the laser light hits, resulting in changes in one or both of the X and Y coordinates.

Figure 8:
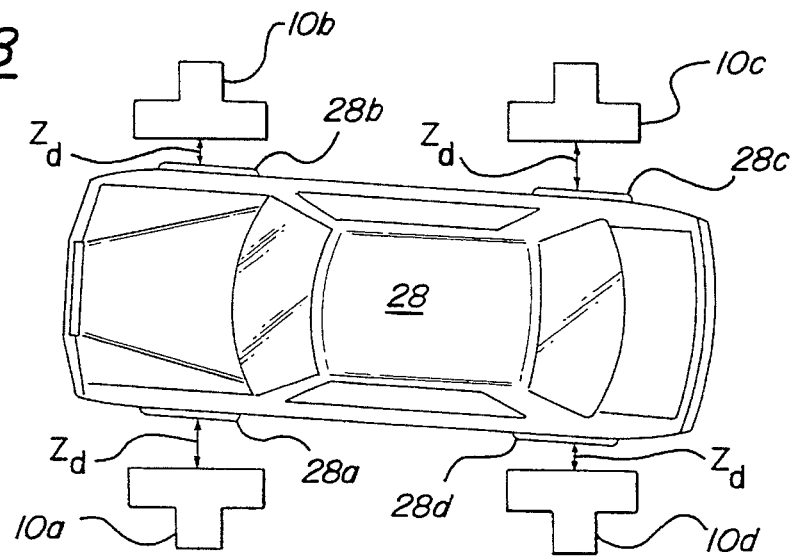
FIG. 8 is a plan view of the vehicle depicting the effect of misalignment of the vehicle with the sensors.

Since toe and camber are expressed as angular quantities relative to the vehicle's longitudinal and vertical axes, respectively, deviations of these axes from parallelism with those of the test rig (i.e., the X and Y axes of sensor 10a, respectively) could result in erroneous toe and camber measurements. In accordance with conventional practice, alignment of the vehicle's and test rig's vertical axes is assumed and deviations between the longitudinal axes are accounted for using a symmetry correction that is determined and implemented in a conventional manner by computer 24. If the vehicle is centered in the test rig with its axes aligned with those of the test rig (and, thus, sensors 10a–10d), the distance $z_d$ between the center of each wheel and its associated sensor will be the same. If not, some or all of the distances $z_d$ will be different. This is illustrated in FIG. 8, which depicts in an exaggerated fashion the effects on $z_d$ of misalignment of vehicle 28 with sensors 10a–10d. By comparing the distances $z_d$ to each other, the symmetry correction needed can be determined and thereafter applied as a part of determining the alignment characteristics of each of the wheels.

One advantage of using sensors 10a–10d to output the X and Y coordinates of the high points of the FTOE, RTOE, and CAM laser lines is that they provide the same information as prior art wheel alignment sensors that require contact with the sidewall of each tire. Thus, wheel alignment machine 26 can utilize conventional techniques for analyzing the sensor output to determine the vehicle's alignment characteristics. This is advantageous because it not only allows for the possibility of retrofitting the sensors on existing contact-based wheel alignment machines with relatively minor modifications, but it permits use of widely known and thoroughly understood techniques for determining the rotational plane of the wheels, the symmetry correction, and from these the wheel alignment characteristics.

Sensor Optical System and Camera

Referring to FIG. 9, optical system 16 will now be described. In general, optical system 16 utilizes a series of mirrors or other reflective elements to perform two primary functions; namely, rotating the CAM laser line so that it has the same orientation as the FTOE and RTOE laser lines, and thereafter combining all three laser lines into a single image that is directed into video camera 18. In particular, optical system 16 includes mirrors 42 and 44 which direct the reflected FTOE laser line into camera 18, mirrors 46 and 48 which direct the reflected RTOE laser line into camera 18, and mirrors 50 and 52 which, along with mirror 48, directs the reflected CAM laser line into camera 18. Camera 18 and mirrors 42, 44, 46, and 48 are each rigidly mounted on a support plate (not shown) that is angled downwardly toward the front of sensor 10a. This gives optical system 16 has a generally downward perspective. The downward angle of the support plate from the horizon (Z-axis) is the same as the angle of the reflected FTOE and RTOE laser light so that those two laser lines enter optical system 16 in a direction parallel to the surface of the support plate. Mirror 42 reflects the FTOE laser line after it enters housing 22 by ninety degrees towards mirror 44. Similarly, mirror 46 reflects the RTOE laser line by ninety degrees towards mirror 48. Mirrors 44 and 48 are each disposed in a plane parallel to their associated mirrors 42 and 46, respectively, to direct the FTOE and RTOE laser lines into camera 18 along paths that are parallel to the paths they took when entering housing 22. The back sides of mirrors 44 and 48 are disposed ninety degrees apart and are in contact with each other along one side that faces the lens 18a of camera 18. As shown, mirrors 44 and 48 substantially fill the field of view (FOV) of lens 18a.

Mirrors 50 and 52 are rigidly mounted within housing 22 so that their position and orientation is fixed with respect to the support plate. If desired, the position of camera 18 and any of the mirrors can of course be initially calibrated or made adjustable for periodic calibration in the field. Mirror 50 reflects the CAM laser line upwards after it enters housing 22 towards mirror 52. This laser line is then reflected towards mirror 48 which directs it into camera 18. As will be appreciated, the additional reflection provided by mirrors 50 and 52 can be used to provide ninety degrees of rotation of the reflected CAM laser line with respect to the FTOE and RTOE laser lines. In this way, the ninety degree difference shown in FIG. 5 between the orientation of the CAM laser line and that of the FTOE and RTOE laser lines can be eliminated.

By combining the three laser lines into a single image, a plurality of advantages are realized. First, only one camera and associated electronics are necessary for each sensor. This eliminates the need for calibrating the positions of multiple cameras within a sensor and eliminates the possibility of erroneous measurements due to errors or changes in the relative positions of the multiple cameras. Second, the three laser lines contained in the image can be related to a common reference, preferably one representing a wheel rotational plane having zero camber and zero toe. This permits direct comparisons between the position of the high points of the laser lines with the common reference and with each other to determine the wheel alignment characteristics. Third, since each sensor only generates a single video image and since the three laser lines within that single image are related to a common reference, real time processing of the camera's video output can be easily accomplished within the sensor to generate conventional coordinate data. Furthermore, the use of optical system 16 to produce the single image seen by camera 18 is advantageous because it provides camera 18 with a view of all three laser lines in the same orientation and without requiring that camera 18 be positioned far enough away from wheel 28a so as to include all three laser lines within the field of view of lens 18a.

Camera 18 can be a conventional video camera that utilizes a ccd sensor having a rectangular array of pixels. Preferably, it comprises a Phillips FTM12 camera that has a sensor array of 1024×1024 pixels, although it will be understood that other types of suitable light responsive receivers could be used, such as a photodiode array or a linescan or rotating polygon linescan camera. Camera 18 is mounted within housing 22 in an orientation that is rotated ninety degrees about its optical axis from what would otherwise be its normal orientation. This is done so that the parabolic laser lines are seen from the camera's angle of reference as extending generally in the vertical direction. More specifically, and as will be apparent from an inspection of FIG. 5, the parabolically-shaped reflected FTOE and RTOE laser lines enter housing 22 as U-shaped images that extend generally in the horizontal direction. Thus, the crown, or high point, of each laser line will be the lowest (i.e., closest to the ground) point on the line. This orientation is maintained by optical system 16. The CAM laser line enters housing 22 in a generally vertical orientation as a C-shaped image and is thereafter rotated by ninety degrees so that it has the same the same U-shaped orientation as FTOE and RTOE when it exits optical system 16. By rotating camera 18 ninety degrees, its top will be proximate one of the sides of housing 22 and the parabolic laser lines will be seen by camera 18 as having either a C-shape or backwards C-shape. As shown in FIG. 9, if camera 18 is rotated such that its top 18b is toward the side of housing 22 at which mirrors 50 and 52 are located, then the three laser lines will be seen by the camera as each having a backwards C-shape.

This orientation of the FTOE, RTOE, and CAM laser lines is shown in FIG. 10, which represents an image 58 outputted by camera 18. In that figure, the three parabolic curves represent the CAM, RTOE, and FTOE laser lines. The labels shown in FIG. 10 for these laser lines are not a part of the image output by camera 18, but rather are included in FIG. 10 for the purpose of clarity. Similarly, the horizontal scan lines 60, 62, and 64 and the vertical reference line 66 shown in that figure are not part of the actual image, but are provided for the purpose of describing how the high points are determined and used as a part of calculating the toe and camber of wheel 28a. Since electronic circuit 20 outputs a VGA video signal for display of the camera image, these labels, reference line 66 and cursors showing each curves high points can be superimposed over the image by circuit 20 for the purpose of display.

By orienting the laser lines with respect to camera 18 in this manner, the camera's video signal output can be easily analyzed by electronic circuit 20. Since the laser lines have a generally vertical orientation, as seen by camera 18, each of a number of successive scan lines of the camera will intersect one of the three laser lines. Since the laser lines have a backwards C-shape, the high point of each line will be that pixel on the laser line having the highest column number of any of the pixels on the laser line. This is depicted in FIG. 11 for the CAM curve of FIG. 10. Camera 18 is programmed by electronic circuit 20 to work in a non-standard operating mode. In this mode, camera 18 outputs a non-standard 40 MHz VBS video signal, which is a composite video signal formatted as a stream of pixel data points arranged into groups. Each of these groups of pixel data points represents one of the scan lines (rows) of the camera's array of pixels. By detecting, for each scan line (i.e., each row of the array of pixels), the column number of the pixel lying on the laser line and comparing that column number to the highest such column number found, the pixel representing the high point of the laser line can be determined. For the RTOE and FTOE laser lines, the row and column number of this pixel represent its X and Y coordinates, respectively. As the CAM laser line has been rotated ninety degrees with respect to the other laser lines, the row and column number of the pixel containing the CAM laser line's high point represent its Y and X coordinates, respectively.

The pixel data points outputted by camera 18 are represented by an analog signal having a voltage level that varies pixel by pixel to indicate the pixel intensity level. Since the pixels lying on a laser line will have a much greater intensity than pixels lying on either side of the line (due in part to the filters 36 and 38), detection of a pixel that is located on the laser line can be accomplished by monitoring the pixel intensity levels. This is carried out by electronic circuit 20 which monitors the voltage level of the camera's video signal, as will be described subsequently.

As mentioned above, the reflected FTOE, RTOE, and CAM laser lines can all be related to a common reference. This can be accomplished by calibrating the positions of lasers 12–14, optical system 16, and, if necessary, camera 18 using a master gauge or buck (not shown) that represents a wheel having zero camber and zero toe. Lasers 12 and 14 are aligned using the buck so that the high points of the resulting parabolic laser lines on the buck both lie within the same horizontal plane. Laser 13 is aligned so that the high point of the resulting laser line on the buck lies within a vertical plane that is midway between the high points of the other two laser lines. Optical system 16 and camera 18 are then aligned so that the high points of the three laser lines lie on a single vertical line (i.e., have the same pixel column number and, thus, the same X coordinate). As a result of this calibration, the three laser lines reflected from the buck will produce image 58 shown in FIG. 10. The vertical reference line 66 of FIG. 10 thus represents the common reference to which the three reflected laser lines of any particular wheel can be related and compared.

Determination of the camber and toe angles involves use of sensor-to-wheel distances $z_f$, $z_r$, and $z_c$ that can be determined from the X and Y coordinates of the laser lines' high points. As discussed above, the use of this coordinate data to determine the sensor-to-wheel distances (and, thus, the camber and toe angles) is well known. However, for the purpose of illustrating certain advantages of sensor 10a, the relationship between the coordinate data and sensor-to-wheel data will now be discussed in connection with FIGS. 12A through 13B.

Figures 12A, 12B:
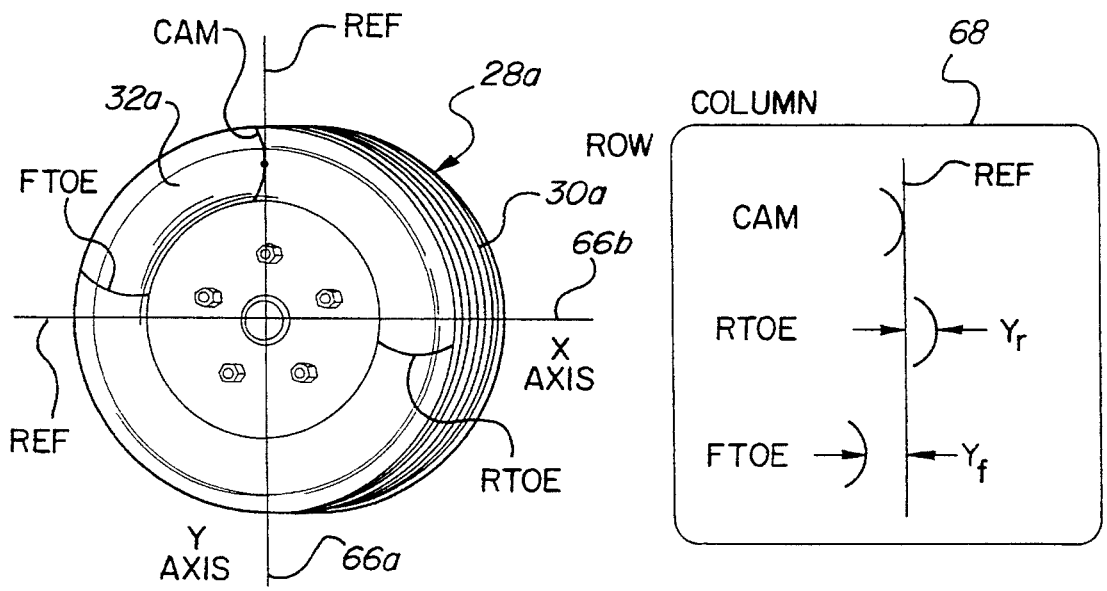
FIG. 12A is a side view of the wheel of FIG. 4 showing how the wheel's toe angle effects the location at which the shaped light hits the tire's sidewall.
FIG. 12B shows the effect of toe on the relative and absolute locations of the reflected shaped light within the image generated by the sensor camera.

FIG. 12A shows wheel 28a having positive toe and zero camber and FIG. 12B shows the resulting image provided by camera 18. As will be appreciated, reference line 66, as it applies to the FTOE and RTOE laser lines, represents the sensor's X-axis and, as it applies to the CAM laser line, represents the sensor's Y-axis. Reference line 66 is therefore shown in FIG. 12A as having been split into two lines 66a and 66b. The positive toe of wheel 28a results in the portion of sidewall 32a closest to the front of the vehicle being farther away from sensor 10a than the reference line 66b. At the same time, it results in the portion of sidewall 32a farthest from the front of the vehicle being closer to sensor 10a than reference line 66b. Since lasers 12 and 14 direct their laser light upwards toward wheel 28a, the FTOE laser line from laser 12 will fall upon sidewall 32a above reference line 66b and its high point will therefore lie on one side of line 66b. Conversely, the RTOE laser line will fall upon sidewall 32a below reference line 66b and its high point will therefore lie on the other side of line 66b. The high point of the CAM laser line lies on the reference line 66a, although this is not necessarily so for zero camber since the vertical axis about which wheel 28a pivots when toe adjustments are made may not extend exactly through the wheel's center. Also, deviations of the high point of the CAM laser line from the line 66a might occur as a result of the vehicle not being properly centered and aligned in the test rig.

As a result of the positive toe shown in FIG. 12A, camera 18 produces an image 68 that includes the CAM, RTOE, and FTOE laser lines, as shown in FIG. 12B. The distances $y_r$ and $y_f$ are the distances along the Y-axis between reference line 66 and the high points of RTOE and FTOE, respectively. These distances together are indicative of the wheel's toe angle. Since the angle between the emitted and received laser light is known, these Y-axis distances can be converted into Z-axis distances $z_r$ and $z_f$ shown in FIG. 6. The Z-axis distances can then be used along with the symmetry correction to calculate the wheel's toe angle. As will be understood by those skilled in the art, the toe angle can be determined by directly converting the total distance $y_t$ (i.e., $Y_r+Y_f$) between these high points into a Z-axis distance $z_t$ and thereafter calculating toe using that distance along with the symmetry correction.

Figures 13A, 13B:
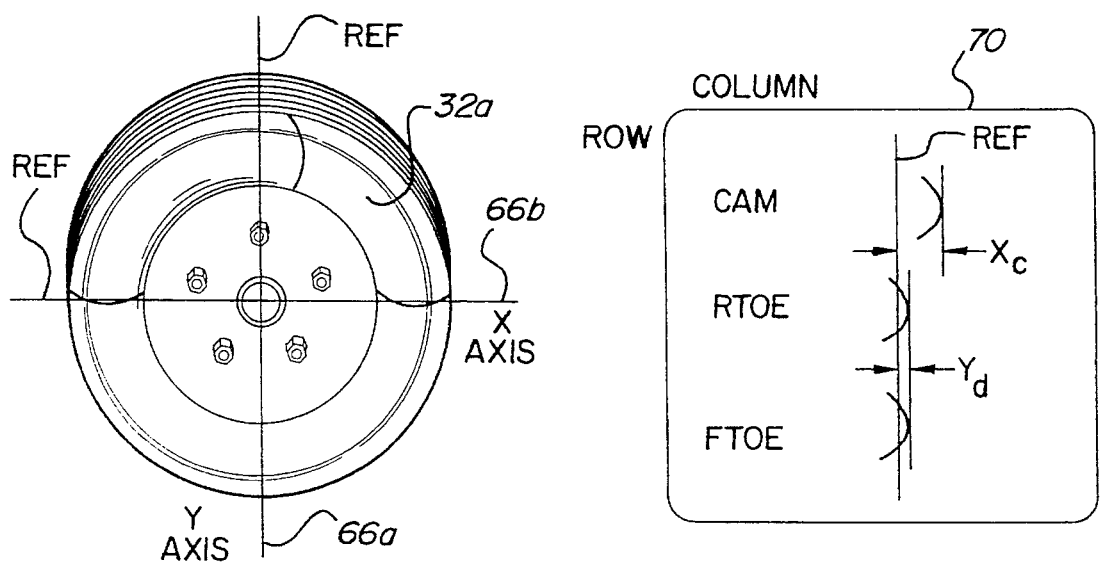
FIG. 13A is a side view of the wheel of FIG. 4 showing how the wheel's camber angle effects the location at which the shaped light hits the tire's sidewall.
FIG. 13B shows the effect of camber on the relative and absolute locations of the reflected shaped light within the image generated by the sensor camera.

FIG. 13A shows wheel 28a having positive camber and zero toe and FIG. 12B shows the resulting image provided by camera 18. The high points of the FTOE and RTOE laser lines are shown as lying slightly below reference line 66b. In this example, the offset of those two laser lines from the reference line occurs not as a result of any toe angle, but because the horizontal axis about which changes in camber are made lies below the horizontal plane containing the center of wheel 28a. The positive camber results in the uppermost part of sidewall 32a being closer to sensor 10a than the lowest part of sidewall 32a. Thus, the CAM laser line projected by laser 13 contacts sidewall 32a at a location to the left of reference line 66a.

The resulting image 70 is shown in FIG. 13B. As will be appreciated, since wheel 28a has a zero toe angle, the line extending through the high points of the RTOE and FTOE laser lines is parallel to reference line 66. The distance $x_c$ equals the displacement along the X-axis of the high point of the CAM laser line relative to reference line 66. The distance $y_d$ equals the distance between reference line 66 and the midpoint of the line segment extending between the high points of the RTOE and FTOE laser lines. Using the known angles between the emitted and received laser light for lasers 12–14, these distances can be converted to the Z-axis distances $z_c$ and $z_d$ that are shown in FIG. 7 and that are used along with the symmetry correction to calculate the camber angle. The distance $y_d$ is used as a part of determining camber to account for the possibility that the actual camber angle of wheel 28*a* is about an axis that does not lie in the horizontal plane containing reference line 66. Further, $y_d$ is determined using the line segment's midpoint to eliminate the effect on the camber calculation of the wheel's toe angle, if any.

Sensor Electronics Overview

Electronic circuit 20 is an event-driven, microprocessor based circuit that processes the video stream from camera 18 and outputs two types of information: 1) X and Y coordinate data for the locations of the high points of each of the three laser lines, and 2) a modified video signal for displaying the three laser lines on monitor 25. As discussed above, the coordinate data can be processed in a well known manner by computer 24 to determine the alignment characteristics of the wheel. Determination of the coordinate data by circuit 20 is carried out in real time, which is possible with only minimal processing power because of the merging of the three laser lines provided by optical system 16.

Before describing the construction and operation of circuit 20 in detail, the format of the raw video signal from camera 18 and an overview of the method for determining the high point of the FTOE, RTOE, and CAM laser lines will be described. The video signal is an analog signal having a voltage that varies at 40 MHz in accordance with the intensity levels of the pixels that it represents. The video signal comprises successive groups of analog pixel data, with each group representing one of the rows of the array of pixels that make up the camera's ccd element. An exemplary scan line (row) for this video signal is depicted in FIG. 15 as VIDEO IN. Each scan line of the video signal is separated by a horizontal sync HS, as shown in FIG. 15. Camera 18 is operated in a non-interlaced mode in which it provides frames containing every other scan line at a rate twice that of the camera's 30 Hz full frame rate. However, rather than providing alternating frames of even and odd-numbered scan lines, camera 18 has its field mode programmed to provide only frames of even-numbered scan lines. Thus, those frames of even-numbered scan lines are outputted by camera 18 at a rate of 60 Hz, with those frames being separated by a vertical sync. The horizontal and vertical syncs, as well as a clock signal at the 40 MHz pixel rate, are also outputted by camera 18 on separate lines, as indicated by HS, VS, and CK40M, respectively, in FIG. 14.

Determination of the location of the laser lines is accomplished by comparing the video signal to a threshold level. Intersection of one of the laser lines with a particular video scan line is represented in the video signal by a voltage level that exceeds that threshold. In this way, a simple comparator can be used to generate a signal that indicates whether or not the pixel intensity level being compared represents an intersection between a reflected laser line and one of the video scan lines. At the beginning of each scan line (i.e., at each occurrence of the horizontal sync signal HS), a counter is begin that increments at the 40 MHz pixel rate. If the video signal voltage exceeds the threshold, this counter is stopped and its count is moved into a latch. If this pixel count represents the high point of the laser line, then it and its corresponding scan line number are utilized by a microprocessor to generate the X and Y coordinate data for that high point.

As discussed in connection with FIG. 11, the high point of any particular laser line is represented by the intersection point having the highest column number. Determination of whether a particular intersection point represents the laser line's high point can be accomplished in various ways. The simplest of these is referred to hereafter as single scan line measurement and involves monitoring only one scan line per laser line. For this technique, the intersection point within that one scan line is assumed to be the laser line's high point. For each laser line, the single scan line actually monitored can be selected as a part of the initial set-up of sensor 10*a* using the master gauge or buck discussed above. More specifically, once lasers 12–14, optical system 16, and camera 18 are properly aligned using the buck, circuit 20 can be commanded to run an initialization routine in which it analyzes successive scan lines to determine the three scan lines containing the three high points of the laser lines reflected from the buck. The row numbers of these three scan lines can then be stored by circuit 20 and thereafter used in connection with vehicle testing to ignore all but those three scan lines when analyzing the video data stream for the three high points. Although the high points of the wheel under test may not lie exactly on these scan lines, the curvature of the laser lines is sufficiently small that, as long as the vehicle is not grossly misaligned with the test rig, the difference in column numbers between the actual high points and the intersection points for the stored row numbers will be small and will have little effect on the accuracy of measurement.

Rather than examining a single scan line for each of the three laser lines, a number of scan lines could be monitored to determine the high point. This can be accomplished either by monitoring every scan line sent from camera 18 or by monitoring only a subset of those scan lines. In either case, determination of the high point involves comparing the column number of each intersection point with the highest column number previously found. For each scan line, if the column number of the intersection point is greater than the highest column number previously found, the new column number is stored (along with the row number) for comparison to that of the next scan line. As will be appreciated, if the column numbers of the intersection point increase for successive scan lines, then the scan line containing the high point of the laser line has not yet been reached. Conversely, if the column numbers of the intersection points decrease, then the scan line containing the intersection point has been passed. At this point no further scan lines need be analyzed for that particular laser line and the stored row and column numbers will represent the X and Y coordinates of the high point. To further refine the analysis of the incoming video data stream, windowing can be utilized not only to ignore certain scan lines (rows) located remotely of the high points, but also to ignore a certain number of columns located remotely on either side of the high points. The location of the window can be determined as a part of the initial set-up using the master gauge, or can be determined for a particular wheel by initially locating the high point for each laser line and then forming a window around that high point and thereafter using the window for subsequent frames of video data. Preferably, the length and width of each window is predetermined.

Sensor Electronics Construction and Operation

Figure 14:
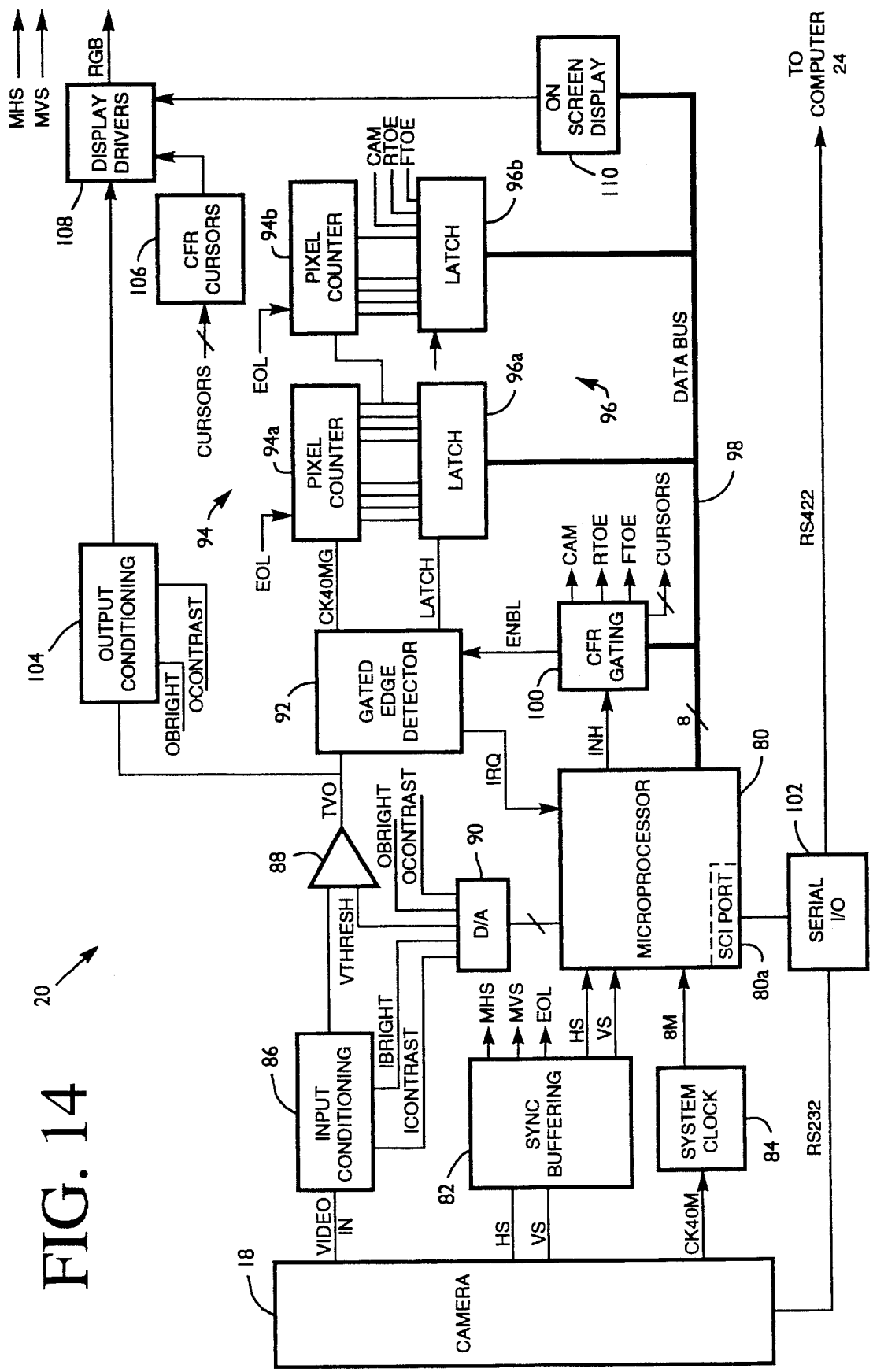
FIG. 14 is a block diagram of the sensor electronics.

FIG. 14 depicts the construction of electronic circuit 20 that provides the above-described real-time image processing and its operation will be discussed in connection with the timing diagram of FIG. 15. At the heart of circuit 20 is a microprocessor 80 that controls monitoring of the scan lines and generation of both the video display and coordinate data that is sent to computer 24. Preferably, microprocessor 80 is an 68HC11E2FN, manufactured by Motorola, that has its control program stored internally in ROM. While microprocessor 80 need not be clocked in synchronism with camera 18, its operation is timed with the video data stream at least on a frame by frame basis, and it therefore uses two of its data inputs to receive the camera's vertical sync signal VS and horizontal sync signal HS via a sync buffering circuit 82. The microprocessor runs at 8 MHz using a clock signal that can either be generated by a crystal oscillator or derived from the camera's 40 MHz clock CK40M using a system clock circuit 84. The video input signal (VIDEO IN) from camera 18 is provided to an input conditioning circuit 86. The output of that circuit is provided to an analog comparator 88 where it is compared to a threshold signal VTHRESH that is generated by a digital-to-analog converter 90 using data from microprocessor 80. For each of the 40 MHz pixels, the output of comparator 88 indicates whether or not that pixel lies on one of the laser lines. It outputs a logic one level if the pixel lies on a laser line and a logic zero level if not. This output is provided to a gated edge detector 92 that, when enabled, responds to a positive transition from comparator 88 by sending an interrupt request (IRQ) to microprocessor 80. Circuit 20 further includes a sixteen bit counter 94 having its thirteen least significant bits connected to the corresponding parallel inputs of a sixteen bit latch 96. Pixel counter 94 is reset at the beginning of each scan line and is operated by a gated clock signal CK40MG that is generated by edge detector 92 using the camera's 40 MHz clock CK40M. In addition to generating an interrupt request, edge detector 92 stops pixel counter 94 and latches the pixel counter data into latch 96. This latched data represents the pixel count from the beginning of the scan line and, hence, the column number of the pixel detected by comparator 88 as lying on the laser line. This pixel count is then read by microprocessor 80 over a data bus 98 as a part of the interrupt service routine (ISR) initiated by the interrupt request IRQ. To implement the single scan line measurement or windowing discussed above, edge detector 92 is selectively enabled and disabled by an enable signal ENBL that is generated by a CFR gating circuit 100 using information obtained from microprocessor 80 over data bus 98. CFR gating circuit 100 also generates three signals, CAM, RTOE, and FTOE used as a part of single scan line measurement to indicate as a part of the pixel count whether the intersection point represented by the pixel count is for the CAM, RTOE, or FTOE laser line.

The blocks of FIG. 14 that comprise circuit 20 will now be described in greater detail, followed by a description of the specific operation of circuit 20. Sync buffering circuit 82 is used to provide microprocessor 80 with the horizontal and vertical sync signals HS and VS. Using these signals, microprocessor 80 can keep track of the scan line to which the incoming pixel data belongs. Sync buffering circuit 82 can also be used to provide microprocessor 80 with an odd/even signal when camera 18 is operated in the non-interlaced mode to provide alternating frames of odd and even scan lines. For video cameras such as camera 18 which provide separate horizontal and vertical sync outputs, sync buffering circuit 82 can simply be inverters or other buffers. For cameras that do not have dedicated sync outputs, but only provide the syncs as a part of a composite picture signal, a video sync separator can be used. For example, sync buffering circuit 82 could utilize an LM1881 manufactured by National Semiconductor that receives the VIDEO IN signal and outputs a composite (horizontal) sync, a vertical sync, and if necessary an odd/even signal, all of which can then be provided to microprocessor 80. The horizontal and vertical sync signals are also buffered to provide a monitor horizontal sync MHS and a monitor vertical sync MVS, respectively. These two monitor sync signals are sent to the video multiplexor 24b of computer 24 to permit synchronization of monitor 25 with the video data stream generated by camera 18. The horizontal sync signal is used to generate an end of line signal which triggers a monostable within circuit 82. This monostable is used to generate the end of line reset pulse EOL shown in FIG. 15 which resets pixel counter 94 at the end of each line and holds it at reset until the first pixel of the next scan line. System clock circuit 84 generates the 8 MHz microprocessor clock using a conventional crystal oscillator. Alternatively, the microprocessor clock signal can be derived from the 40 MHz clock signal CK40M output by camera 18.

Input conditioning circuit 86 utilizes a wideband video amplifier, such as an LM1201 manufactured by National Semiconductor. It receives an input contrast signal (ICONTRAST) and an input brightness signal (IBRIGHT) generated by DAC 90 using data from microprocessor 80. These signals are used by the video amplifier to provide suitable amplification and dc offsets to the raw video data stream (VIDEO IN) to bring it to the appropriate levels for comparison to the threshold voltage VTHRESH.

Comparator 88 can be a standard voltage comparator, such as an LM 311 manufactured by National Semiconductor. It receives the conditioned VIDEO IN signal generated by conditioning circuit 86 as one input and the threshold voltage VTHRESH from DAC 90 as its other input. As shown in FIG. 15, its output, TVO, is at a logic zero level when VIDEO IN<VTHRESH and changes to a logic one level when VIDEO IN crosses VTHRESH.

Gated edge detector 92 receives the TVO signal generated by comparator 88. When enabled by CFR gating circuit 100, edge detector 92 responds to transitions of the TVO signal to do several things: 1) it generates the interrupt request IRQ to inform microprocessor 80 that an intersection point has been found, (2) it stops counter 94 to hold the pixel count at the column number within which the intersection point is located, and (3) it latches that pixel count into latch 96. Edge detector 92 can be implemented in part using a CD4538 or other suitable monostable multivibrator that is triggered by positive transitions of the TVO signal. Edge detector 92 is enabled or disabled by gating the output of this monostable with the enable signal ENBL. When edge detector 92 is enabled, the gated output pulse can then be used to generate the interrupt request signal IRQ and to trigger a second monostable that generates a LATCH signal that latches the pixel count data into latch 96. The ENBL, IRQ, and LATCH signals are shown in FIG. 15 and their timing and use will be further described below. It will of course be understood that microprocessor 80 could be interrupted using one of its data or other inputs configured to recognize logic transitions, rather than utilizing a dedicated interrupt request input. Also, microprocessor 80 could be configured to monitor one of its data inputs for a logic level that indicates detection of an intersection point. Thus, as used herein, the term "interrupt input" will be understood to refer to either a dedicated interrupt input or any other microprocessor input that can be used to inform microprocessor 80 of the detection of a pixel on one of the laser lines.

The gated clock CK40MG that is used to increment counter 94 can be generated by gating the camera's CK40M with the inverted output of this second monostable so that, as soon as it is triggered, the CK40M clock signal is inhibited from further incrementing counter 94. If it is desirable to detect the end of the intersection between a laser line and scan line, then negative going transitions of TVO can be detected by edge detector 92 as well. This could be done by providing TVO to a negative edge triggered monostable whose output is OR-tied with the output of the first monostable prior to that output being gated with the ENBL signal.

Pixel counter 94 can be implement using two, eight bit counters 94a and 94b, which can each be implemented using a 74HCT393 dual, four-bit binary ripple counter configured as an eight-bit counter. The MSB of counter 94a is connected as the clock input of counter 94b to provide a sixteen bit counter. As indicated above, the first clock input of counter 94a receives the gated 40 MHz clock CK40MG and counters 94a and 94b have their reset inputs connected to receive the end of line reset pulse EOL so that they are reset at the beginning of each new scan line. The output of counters 94a and 94b are provided to latch 96.

Latch 96 comprises a pair of eight-bit latches 96a and 96b, with latch 96a receiving pixel count data from counter 94a and latch 96b receiving pixel count data from counter 94b. These latches provide temporary storage of the pixel count until it is read by microprocessor 80 via data bus 98. They can be implemented using 74HCT373 tri-state, octal D-type latches. As indicated above, the clock inputs of these two latches receives the LATCH signal from edge detector 92. Since, in the illustrated embodiment, data bus 98 is only eight bits wide, only eight bits of the pixel count are read at a time by microprocessor 80 and the output enable (OE) inputs of latches 96a and 96b must therefore be asserted sequentially rather than simultaneously. As will be understood by those skilled in the art, this can be accomplished by assigning a unique address to each latch and then connecting a 74HCT138 or other suitable decoder to the address lines of microprocessor 80. In this way, microprocessor 80 can select latch 96a, latch 96b, or any other chip connected to the data bus by providing its associated address on the microprocessor's address lines.

CFR gating circuit 100 is used to selectively enable and disable edge detector 92. In particular, edge detector 92 is disabled (1) during the occurrence of those pixel data points for which monitoring is not desired and (2) following an interrupt request by edge detector 92. Single scan line measurement is achieved by disabling edge detector 92 during every scan line except those three selected by microprocessor 80 as containing a different one of the high points of the three laser lines. Windowing is achieved by disabling edge detector 92 during those scan lines that are to be completely ignored and during occurrence of those pixel data points of the remaining scan lines that are outside the window. Thus, for example, for a window around the CAM laser line that extends from row (scan line) 250 to row 350 and from column 500 to column 700, edge detector 92 would be disabled for the even-numbered rows before 250 and after 350 and, for the rows from 250 to 350 would be disabled for the columns (pixel data points) within each row that are before 500 and after 700. Thus, microprocessor 80 could only be interrupted in response to the pixel intensity level of a pixel data point located within this window.

CFR gating circuit 100 can be constructed in a variety of ways to disable edge detector 92 during the appropriate times. Preferably, this is accomplished using three video sync separators (one per laser line) that are programmed via data bus 98 by microprocessor 80 to generate blanking signals during those scan lines and/or pixel data points that are to be ignored. The blanking signals output by these three sync separators can be combined to form the enable signal ENBL that disables edge detector 92. These three sync separators can be implemented using three LM 1882 video sync separators, manufactured by National Semiconductor, and the programming necessary to generate the blanking signals is well within the level of skill in the art. These sync separators can be updated as necessary by microprocessor 80 once each frame (i.e., following each vertical sync VS), although this update information is not necessary if single scan line measurement is utilized. For each of the three sync separators, the update information can be determined during the previous video frame as a part of the interrupt service routine executed for its associated laser line. That information can then be stored in temporary memory, such as an external RAM, until used by microprocessor 80 to update the sync separators. Optionally, if edge detector 92 is only to be enabled or disabled on a row-by-row basis, these three sync separators would not be required. Rather, microprocessor 80 could simply provide a single bit that is updated at the beginning of each scan line and that specifies whether or not edge detector 92 should be disabled during that scan line. This bit could then be provided directly to edge detector 92 to gate the TVO signal and CFR gating circuit 100 would therefore not be needed.

Disabling of edge detector 92 following an interrupt request is accomplished using an inhibit signal (INH) output from microprocessor 80. As discussed in greater detail below, the interrupt request sent from edge detector 92 to microprocessor 80 causes the microprocessor to begin execution of an interrupt service routine. The inhibit signal INH is asserted during this interrupt service routine to prevent the occurrence of additional interrupts while the interrupt service routine is being executed. This is shown in FIG. 15. The inhibit signal INH can be combined with the blanking signals as a part of forming the enable signal ENBL used to enable and disable edge detector 92. For any particular scan line, the first pixel data point having an intensity level above the threshold (and, thus, the first interrupt generated during that scan line) is assumed to represent the intersection of that scan line with one of the three laser lines. However, other tests for the intersection point could be made. For example, once the first interrupt on a monitored scan line is generated, a small number of consecutive pixel data points could be monitored as a way of verifying that those pixel data points represent the intersection of one of the laser lines with the current scan line. Other such variations will become apparent to those skilled in the art.

As discussed above, for single scan line measurement, microprocessor 80 determines which three scan lines are to be monitored and provides this information to CFR gating circuit 100 so that edge detector 92 can be disabled for all but those three lines. When an interrupt is generated for a scan line being monitored, microprocessor 80 needs to know which of the three scan lines is associated with that pixel count. This can be accomplished using microprocessor 80 to count the number of horizontal syncs HS occurring since the last vertical sync VS. When the interrupt occurs, the current count of horizontal syncs will indicate the scan line to which the pixel count belongs. Another way to determine the scan line associated with the pixel count would be to reset a counter at the beginning of each frame and increment the counter once for every interrupt. Then, the number in the counter (1, 2, or 3) will indicate which one of the three scan lines is associated with the pixel count.

Yet another way to determine the scan line is to place data indicative of the current scan line into the upper, unused bits of the pixel count. More specifically, since camera 18 has 1024 pixels per scan line (row), the pixel count provided by counter 94 will not exceed 1024 and only ten bits of counter 94 are therefore needed. This leaves the six most significant bits of counter 94b available for storing other data. Three of these unused bits can be used in single scan line measurement to store with the pixel count data indicative of the scan line for which the pixel count relates. This is accomplished by using CFR gating circuit 100 to generate three signals, one for camber (CAM), one for the forward toe (FTOE), and one for the rearward toe (RTOE). These signals are connected to the three most significant bits of latch 96b instead of the corresponding bits from counter 94b. Each of these signals is asserted when its associated scan line is being monitored. Thus, only one of these signals is asserted at a time and its asserted state will be latched into latch 96b along with the upper bits of the pixel count. Microprocessor 80 can thereafter check these three most significant bits to determine which of the three scan lines is associated with the pixel count.

Electronic circuit 20 also includes a serial I/O circuit 102 that is connected to the SCI port 80a of microprocessor 80, as well as to camera 18 by an RS232 serial line and to serial card 24a of computer 24 by an RS422 serial line. These serial lines can be used to transfer initialization commands and programming between computer 24, microprocessor 80, and camera 18. For example, the RS232 serial line can be used to set the shutter speed, gain, and other programmable parameters of camera 18. The RS422 serial line is used to transfer the coordinate data from sensor 10a to computer 24 for determination of the camber and toe.

Circuit 20 further includes an output conditioning circuit 104, a CFR cursors circuit 106, a set of display drivers 108, and if desired an on-screen display circuit 110. These circuits are used to generate an image for display that includes the CAM, RTOE, and FTOE laser lines and a cross-hair cursor at the high point of each of the laser lines. Output conditioning circuit 104 receives the TVO signal output by comparator 88. As will be appreciated, the TVO signal represents a one bit intensity data point—either zero or full intensity. Conditioning circuit 104 utilizes the same video amplifier used by input conditioning circuit 86 and applies an output contrast signal (OCONTRAST) and an output brightness signal (OBRIGHT) that are generated by microprocessor 80 and converted to an analog signal by DAC 90. These conditioning signals are used to provide the proper dc offsets and amplification/attenuation to the TVO signal so that it is suitable for display on monitor 25. The conditioned TVO signal is provided to display drivers 108 that generate the R,G,B or other signals needed by monitor 25.

Superimposed on the image provided by output conditioning circuit 106 are the cursors provided by CFR cursors circuit 106. These cursors can be generated using the three video sync separators within CFR gating circuit 100 to generate additional blanking signals that are combined in CFR cursors circuit 106 to generate the cross hairs. The sync separators are programmed to generate the cursor blanking signals at the beginning of each frame and, therefore, the cursors are generated at the locations of the high points determined during the previous frame. The output of cursors circuit 106 is summed with the output of conditioning circuit 104 and the resulting signal represents a single image containing the three laser lines with a cross hair cursor located at the high point of each of the curves.

FIG. 15 depicts various exemplary waveforms and their timing for a single monitored scan line. In single scan line measurement, this single scan line would be one of the three scan lines determined during initial calibration as containing one of the three laser lines' high points. For the purposes of illustration, this single scan line will be taken to be the scan line containing the high point of the CAM laser line and the CAM signal generated by CFR gating circuit 100 is therefore included in FIG. 15.

When camera 18 and circuit 20 are initially powered up, camera 18 is initialized to set its various programmable features (e.g., shutter speed, field mode) as desired. This programming is provided via the RS232 line and can be provided either by microprocessor 80 operating under its control program, or by computer 24. Microprocessor 80 also outputs the ICONTRAST, IBRIGHT, OCONTRAST, and OBRIGHT signals to DAC 90, which converts them to analog form and provides them to conditioning circuits 86 and 104. Microprocessor 80 thereafter begins processing the video data outputted by camera 18.

At the beginning of a frame, microprocessor 80 updates the video sync separators of CFR gating circuit 100, if necessary, with the new scan line and cursor information. The ENBL signal is kept unasserted by the these sync separators and the INH output of microprocessor 80 until the beginning of the scan line that was determined during calibration as containing the high point of the CAM laser line. While the ENBL signal is unasserted, transitions of TVO due to the conditioned VIDEO IN signal crossing the threshold signal VTHRESH do not result in generation of an interrupt request IRQ. At the beginning of each scan line, the horizontal sync HS causes generation of the end of line reset pulse EOL that resets pixel counter 94. Then, counter 94 begins counting in synchronism with the incoming pixel data points for the current scan line. For scan lines not being monitored, the pixel counter will keep counting until it is reset by the next EOL pulse.

At the beginning of the CAM scan line, the CAM signal from CFR gating circuit 100 is asserted, causing the ENBL signal to be asserted and thereby enabling edge detector 92. At this point, any positive transitions of TVO will result in generation of an interrupt request IRQ that begins the microprocessor's interrupt service routine. Thus, as shown in FIG. 15, when the voltage of the conditioned VIDEO IN signal crosses the threshold voltage VTHRESH, TVO goes high causing generation of the interrupt request IRQ, as well as the LATCH signal that latches the pixel count into latch 96. At the same time, the gated 40 MHz clock CK40MG used to increment counter 94 is disabled. During execution of the interrupt service routine, the INH output of the microprocessor is asserted, causing the ENBL signal to become unasserted. This disables edge detector 92 from generating further interrupts, such as would otherwise occur as a result of the positive transition of TVO shown at (a) in FIG. 15.

As a part of the interrupt service routine, microprocessor 80 reads the pixel count from latch 96 and associates it with the scan line to which it belongs. Once all three high points have been found for a particular frame, microprocessor 80 uses the stored pixel counts and scan line (row) numbers to generate the coordinate data to be sent to computer 24. This coordinate data can be in the form of raw data (pixel count and scan line number) or can be converted to scaled engineering units, as desired for a particular application.

The combination of arranging the three laser lines into a single image and the use of a comparison circuit to detect the intersection point between a laser line and video scan line provides a significant advantage over prior art non-contact optical wheel alignment sensors. Not only does this combination of features permit real-time determination of the spatial positions of the three points used to define the rotational plane of the wheel, but also it permits the sensor to output conventional data that can be processed using widely known techniques for determining the wheel alignment characteristics.

Rotation of the Vehicle Wheel's During Measurement

As is known, measurement of a wheel's camber and toe angle is preferably undertaken while the wheel is rotated on its axle. Measurement of these alignment characteristics by sensor 10a while the wheel is rotating has certain advantages. First, kinematic effects of the rotating wheel (e.g., play in the ball-bearings) will be reflected in the measurement. Second, rotation of the wheel during measurement permits surface irregularities on the tire sidewall to be averaged out or even completely eliminated. For example, raised lettering on the tire sidewall that affects the position of the FTOE high point will have the same affect on the position of the RTOE high point once the wheel has rotated 180°. Since the toe measurement is determined in accordance with the difference in position of the high points of the RTOE and FTOE laser lines, these two effects will offset one another and the effects of the raised lettering will therefore be averaged out over the course of a full revolution.

For any particular wheel alignment application, the speed of rotation of the wheel is limited only by the number of points required per revolution. To achieve a data point every two degrees of rotation, the wheel would be rotated at a rate of one revolution every three seconds, giving 180 data points per revolution for a video frame rate of 60 Hz. Preferably, the coordinates of the high points of the three laser lines are averaged over the course of 90° of rotation and this average data is sent to computer 24 along with or in lieu of the instantaneous coordinate data. This can be implemented under control of microprocessor 80 using an array that stores high point locations and then averages those values once the array is full. The array can have a variable size determined in accordance with the speed of rotation so that the array becomes full at the completion of each 90° of rotation of the wheel.

Other Applications

As should now be apparent, since the rotational plane of the wheels can be determined using the sensors 10a–10d, other wheel alignment characteristics, such as the caster and steering axis inclination (SAI) angles, can be determined. One technique for determining these angles is described in U.S. Pat. No. 5,291,660, issued Mar. 8, 1994 to A. Koerner, the disclosure of which is hereby incorporated by reference. That patent discloses techniques for determining the caster and SAI angles of steerable wheels in accordance with measured coordinate displacements of the wheel when the wheel is steered left and right through the same angle. As will be appreciated, the sensors of the present invention could be used to generate coordinate data from which the displacements could be determined. These displacements could then be used with the measured steered angle to determine the caster and SAI angles, as is explained in detail in that patent.

Furthermore, although sensor 10a has been described as it might be used in a wheel alignment machine, it will be appreciated by those skilled in the art that, in the broader aspects of the invention, the sensor of the present invention can be used to determine the position, orientation, or other spatial attribute of any of a number of objects other than vehicle wheels and that its application is therefore not limited to wheel alignment. Since the sensor method and apparatus of the invention permits real-time analysis of one or more such spatial attributes, it can be used in such applications as: robotics or other automation control to track a moving target; real-time object distance, angle, and/or position detection; and real-time visual guidance control. Also, it could be utilized for analyzing speed, motion, and/or vibration of one or more objects. Other optical devices could be used in addition to or in lieu of optical system 16 to provide the field of view, orientation, resolution, or other optical characteristic desired for the particular application. For instance, bore scopes, fiber optics, and anamorphic lenses or mirrors could be used to provide the desired object orientation and perspective.

It will thus be apparent that there has been provided in accordance with the present invention an optical sensor method and apparatus which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, in the illustrated embodiment, rather than using mirrors within optical system 16, bundles of fiber optics could be used to receive the three reflected laser lines, rotate the CAM laser line, and then combine the three lines into the single image seen by camera 18. All such variations and modifications are intended to come within the scope of the appended claims.

We claim:

1. In a sensor for use in a wheel alignment machine to measure the orientation of a tire on a vehicle to thereby determine one or more alignment characteristics of the vehicle, said sensor being of the type having at least one light source oriented to project shaped light onto a sidewall of the tire at a plurality of spaced locations and a light responsive receiver oriented at a perspective angle with respect to said light source to receive an image that includes a portion of the shaped light that is reflected off the tire, with said light responsive receiver being operable to generate electrical signals indicative of the image, wherein the improvement comprises:

a system of optical elements oriented relative to said light responsive receiver to provide said light responsive receiver with an optical view that includes the plurality of spaced locations of the tire, whereby portions of the shaped light that are reflected off the tire at each of the plurality of spaced locations are received by said light responsive receiver as a single image; and an electronic circuit responsive to said electrical signals to determine the location within the image of a predetermined feature of each of the reflected portions of shaped light, said circuit further being operable to generate output data representative of the locations of said predetermined features.

2. A sensor as defined in claim 1, wherein said optical elements are oriented to rotate at least one reflected portion of the shaped light with respect to at least another reflected portion of the shaped light.

3. A sensor as defined in claim 2, wherein said at least one light source comprises first, second, and third lasers, each of which is oriented to project a stripe of laser light onto the sidewall at a different one of the plurality of spaced locations, whereby the shaped light at each of the plurality of spaced locations comprises a stripe of laser light.

4. A sensor as defined in claim 3, wherein said first and second lasers are oriented to project light in substantially parallel planes and said third laser is oriented to project light in a plane that is substantially perpendicular to said parallel planes.

5. A sensor as defined in claim 3, wherein:

said light responsive receiver comprises a video camera having an image receiving element that includes successive scan lines, each of which comprises a number of pixels;

said video camera is oriented to receive the reflected portions of the stripes of laser light as lines of laser light that intersect at least some of said scan lines;

said video camera is operable to generate said electrical signals as a stream of pixel data points arranged into successive lines of said pixel data points, with each of said lines of pixel data points representing one of said scan lines;

said electronic circuit includes a microprocessor and is operable to monitor said stream of pixel data points as it is received from said video camera and to interrupt said microprocessor when said electronic circuit receives a particular pixel data point representative of any of the reflected portions of the stripes of laser light; and said microprocessor is operable in response to said interrupt request to acquire a pixel count representing the position of said particular pixel data point within its associated line of pixel data points.

6. A sensor as defined in claim 1, wherein:

said light responsive receiver comprises a video camera that generates said electrical signals as a stream of pixel data points arranged into successive lines of said pixel data points, with each of said lines of pixel data points representing one row of an array of pixel data points that together represent the image;

said electronic circuit is operable to monitor said stream of pixel data points as it is received from said video camera and provide said microprocessor with an interrupt request when said electronic circuit receives a particular pixel data point representative of any of the reflected portions of the shaped light; and said microprocessor is operable in response to said interrupt request to acquire a pixel count representing the position of said particular pixel data point within its associated line of pixel data points.

7. A sensor as defined in claim 1, wherein said optical elements include a plurality of mirrors oriented to direct the reflected portions of the shaped light into said light responsive receiver.

8. A sensor as defined in claim 1, wherein said circuit is operable to generate coordinate output data indicative of the location of a preselected feature of each of the reflected portions of shaped light.

9. A method for generating data indicative of the orientation of a tire on a vehicle, comprising the steps of:

(a) projecting shaped light onto a sidewall of a tire at a plurality of spaced locations, (b) receiving an image that includes portions of the shaped light reflected at an angle off said sidewall from each of said plurality of spaced locations, (c) generating a video signal that comprises a stream of pixel intensity levels arranged into successive groups of said pixel intensity levels, each of said groups representing a row of an array of pixels intensity levels that together represent said image, (d) providing a threshold intensity level that is less than those of said pixel intensity levels that represent said reflected portions of the shaped light, (e) determining a plurality of pixel counts by repeating the following steps (e1) through (e3) for each of a plurality of said groups of pixel intensity levels:

(e1) comparing, in real time, said threshold intensity level with at least some of the pixel intensity levels of one of said groups, (e2) generating a logic signal when one of said pixel intensity levels exceeds said threshold intensity level, and (e3) determining, in response to an occurrence of said logic signal, one of said pixel counts in accordance with the position of said one of said pixel intensity levels within said one of said groups, and (f) using said pixel counts to generate output data representative of the spatial position of said plurality of spaced locations.

10. The method of claim 9, wherein:

step (c) further comprises generating said video signal as an analog signal having a voltage level that varies in accordance with each of said pixel intensity levels, and step (e1) further comprises using a comparator to compare said threshold intensity level and said pixel intensity levels.

11. The method of claim 9, further comprising carrying out step (e3) only once for each of the plurality of spaced locations.

12. The method of claim 9, further comprising the step of using the pixel counts to determine the location of a predetermined feature of each of the reflected portions of the shaped light.

13. The method of claim 12, further comprising generating said output data in accordance with the locations of the predetermined features.

14. In a sensor for use in a wheel alignment machine to measure the orientation of a tire on a vehicle to thereby determine one or more alignment characteristics of the vehicle, said sensor being of the type having at least one light source oriented to project shaped light onto a sidewall of the tire at a plurality of spaced locations and a light responsive receiver oriented at a perspective angle with respect to said light source to receive an image that includes a portion of the shaped light that is reflected off the tire, with said light responsive receiver being operable to generate electrical signals indicative of the image, wherein the improvement comprises:

an event-driven microprocessor circuit connected to receive said electrical signals from said light responsive receiver, said circuit including a microprocessor having an interrupt input; and a system of optical elements oriented relative to said light responsive receiver to provide said light responsive receiver with an optical view that includes the plurality of spaced locations of the tire, whereby portions of the shaped light that are reflected off the tire at each of the plurality of spaced locations are received by said light responsive receiver as a single image;

said circuit being operable, in response to detecting in real time the presence within the image of the reflected portion of the shaped light, to generate an interrupt request on said interrupt input.

15. A sensor as defined in claim 14, wherein:

said at least one light source comprises a plurality of lasers, each of which is oriented to project a stripe of laser light onto the sidewall at a different one of the plurality of spaced locations with the stripes of laser light extending radially with respect to the tire, whereby the portion of the shaped light reflected from each of the plurality of spaced locations comprises a stripe of laser light;

one of said lasers being oriented to project a first stripe of laser light in a first plane and another of said lasers being oriented to project a second stripe of laser light in a second plane that forms an angle with said first plane; and said optical elements are oriented to cause rotation of the reflected portion of the first stripe of laser light relative to the reflected portion of the second stripe of laser light such that the reflected portions of the first and second stripes of laser light enter said light responsive receiver having the same orientation.

16. In an optical sensor for generating data indicative of a spatial attribute of an object, said sensor being of the type having at least one light source oriented to project shaped light onto the object at a plurality of spaced locations and a light responsive receiver oriented at a perspective angle with respect to said light source to receive an image that includes a portion of the shaped light that is reflected off the object, with said light responsive receiver being operable to generate electrical signals indicative of the image, wherein the improvement comprises:

an event-driven microprocessor circuit connected to receive said electrical signals from said light responsive receiver, said circuit including a microprocessor having an interrupt input; and a system of optical elements oriented relative to said light responsive receiver to provide said light responsive receiver with an optical view that includes the plurality of spaced locations of the object, whereby portions of the shaped light that are reflected off the object at each of the plurality of spaced locations are received by said light responsive receiver as a single image;

said circuit being operable, in response to detecting in real time the presence within the image of the reflected portion of the shaped light, to generate an interrupt request on said interrupt input.

* * * * *